March 2, 1954 G. W. HERROLD 2,670,705

METHOD AND APPARATUS FOR FEEDING GASKETS AND FOR INSERTING THEM IN CLOSURES

Filed March 13, 1947 12 Sheets-Sheet 1

INVENTOR

Gordon W. Herrold

BY Norman N. Holland

ATTORNEY

INVENTOR
Gordon W. Herrold
BY
Norman N. Holland
ATTORNEY

March 2, 1954 G. W. HERROLD 2,670,705

METHOD AND APPARATUS FOR FEEDING GASKETS AND FOR INSERTING THEM IN CLOSURES

Filed March 13, 1947 12 Sheets-Sheet 3

INVENTOR
Gordon W. Herrold
BY
Norman N. Holland
ATTORNEY

March 2, 1954 G. W. HERROLD 2,670,705

METHOD AND APPARATUS FOR FEEDING GASKETS AND FOR INSERTING THEM IN CLOSURES

Filed March 13, 1947 12 Sheets-Sheet 4

INVENTOR
Gordon W. Herrold
BY
Norman N. Holland
ATTORNEY

March 2, 1954 G. W. HERROLD 2,670,705
METHOD AND APPARATUS FOR FEEDING GASKETS AND FOR INSERTING THEM IN CLOSURES
Filed March 13, 1947 12 Sheets-Sheet 5
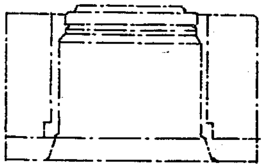
Fig. 11
Fig. 9
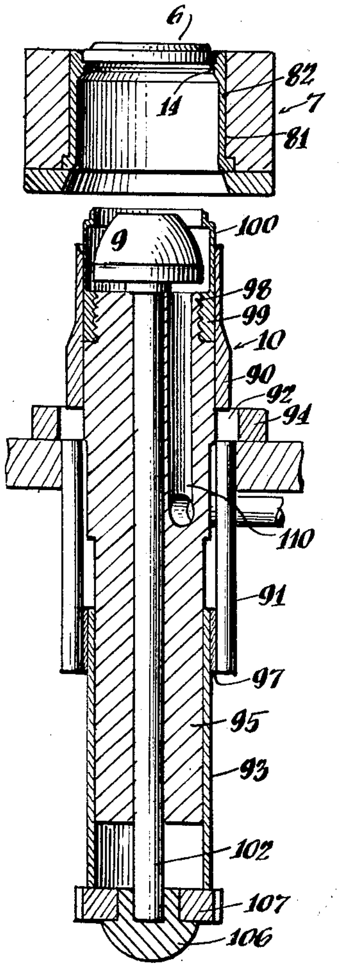
Fig. 10
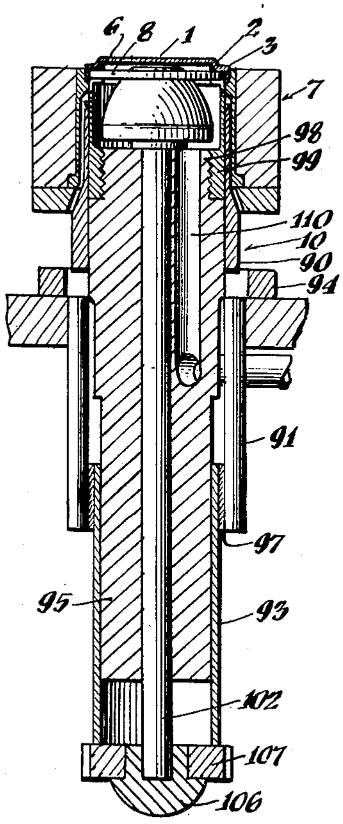
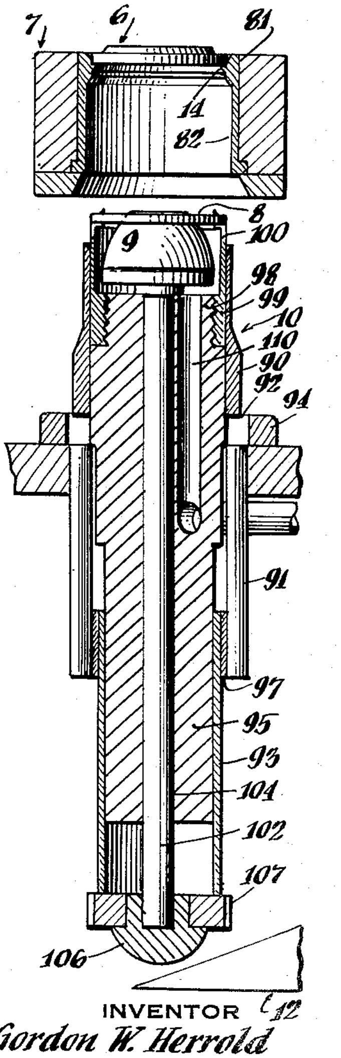
INVENTOR
Gordon W. Herrold
BY
Norman N. Holland
ATTORNEY March 2, 1954 G. W. HERROLD 2,670,705

METHOD AND APPARATUS FOR FEEDING GASKETS AND FOR INSERTING THEM IN CLOSURES

Filed March 13, 1947 12 Sheets-Sheet 6

INVENTOR
Gordon W. Herrold
BY
Norman N. Holland
ATTORNEY

INVENTOR
Gordon W. Herrold
BY
Norman N. Holland
ATTORNEY

March 2, 1954 G. W. HERROLD 2,670,705

METHOD AND APPARATUS FOR FEEDING GASKETS AND FOR INSERTING THEM IN CLOSURES

Filed March 13, 1947 12 Sheets-Sheet 8

INVENTOR
Gordon W. Herrold
BY
Norman N. Holland
ATTORNEY

INVENTOR
Gordon W. Herrold
BY
Norman N. Holland
ATTORNEY

INVENTOR
Gordon W. Herrold
BY
Norman N. Holland
ATTORNEY

INVENTOR
Gordon W. Herrold
BY
Norman ... Holland
ATTORNEY

March 2, 1954 G. W. HERROLD 2,670,705

METHOD AND APPARATUS FOR FEEDING GASKETS AND FOR INSERTING THEM IN CLOSURES

Filed March 13, 1947

12 Sheets-Sheet 12

INVENTOR
Gordon W. Herrold
BY
Norman N. Holland
ATTORNEY

Patented Mar. 2, 1954

2,670,705

UNITED STATES PATENT OFFICE 2,670,705

METHOD AND APPARATUS FOR FEEDING GASKETS AND FOR INSERTING THEM IN CLOSURES

Gordon W. Herrold, Connellsville, Pa., assignor to Anchor Hocking Glass Corporation, Lancaster, Ohio, a corporation of Delaware Application March 13, 1947, Serial No. 734,457

21 Claims. (Cl. 113—80)

The present invention relates generally to a method and apparatus for feeding gaskets and for inserting the gaskets in closures, and more particularly to a method and machine applicable to ring gaskets made from a rubber composition suitable for forming hermetic seals on containers.

In the manufacture of closure caps having ring gaskets therein, for example the general type shown in Patents Nos. 1,909,406 and 2,200,081, owned by the assignee hereof, the metal blank is stamped from a sheet of metal and shaped by suitable dies and rollers into the proper form. The gaskets for forming hermetic seals are usually cut from a tube of vulcanized rubber composition. These cut gaskets after being stored in boxes or barrels are then inserted into the closures. The closures are shipped with the gaskets in them and sealed to containers by suitable sealing machines.

The insertion of the gaskets into the closure blanks is a difficult and tedious operation. The gaskets in some cases become twisted after being cut or during storage or shipment, which further complicates the operation.

The machine illustrated in the Weiland Patent No. 1,776,227, owned by the assignee hereof, attempts to overcome the problems encountered, but it is not as rapid as desirable in its operations and requires excessive labor. In addition, the machine cuts or otherwise damages a substantial percentage of the gaskets in its operations. As a result, many gaskets are still inserted in closures by hand. Closures with gaskets therein are sold in large quantities. Any slight saving in the cost of a thousand caps aggregates large savings over a period of a year.

The present invention relates to a method and machine for feeding gaskets and inserting them in closures. The invention minimizes or overcomes prior difficulties, operates at a high speed without damaging either the gasket or the closure, and operates with a minimum of labor and supervision, thereby reducing the cost of the finished articles. The gaskets are forcefully retained in their true shape prior to feeding, are securely seated on an inserting tool and positively retained in their proper shape, and finally inserted into the closure by a positive operation which forces the gasket against the flange of the closure throughout its periphery. The shape of the gasket is preserved both prior to feeding and at the time of insertion, and mutilation is eliminated or minimized.

An object of the present invention is to provide an improved method and machine for feeding gaskets.

Another object of the invention is to provide an improved method and machine for inserting gaskets into closures.

Another object of the invention is to provide an improved method and machine for feeding gaskets and for inserting the gaskets into closures.

Another object of the invention is to increase the speed at which gaskets may be fed for insertion into closures and to increase the speed of inserting the gaskets in the closures.

Another object of the invention is to provide a method and machine which operates continuously, thereby eliminating the intermittent motion necessary in the operation of prior machines.

Another object of the invention is to minimize the mutilation of gaskets in feeding and inserting them into closures.

Another object of the invention is to minimize the labor and supervision required in the feeding of gaskets and insertion of them into closures.

Another object of the invention is to provide a simple machine which may be constructed of a minimum number of parts which are not likely to require excessive repairs.

Another object of the invention is automatically to control the feeding of the gaskets responsive to the speed of insertion.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 9 is a sectional view of the closure cap and gasket holders with the elements moved toward each other for insertion of a gasket;

Fig. 10 is a sectional view with the closure cap and gasket holders moved together with the gasket within the closure;

Fig. 11 illustrates the closure cap holder moving upwardly with the assembled closure cap and gasket to a position for removal of the cap from the holder;

Figure 1:
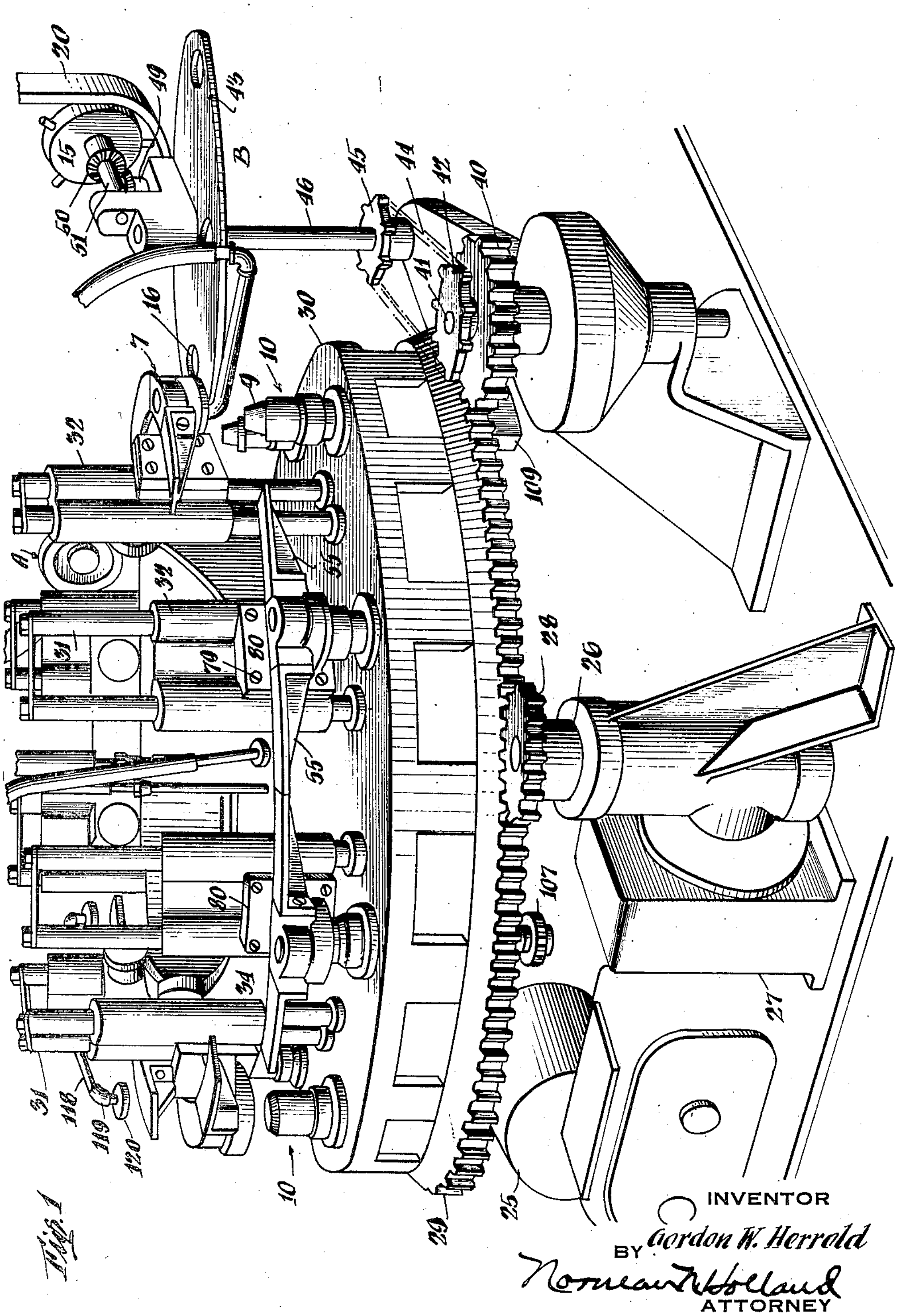
Fig. 1 is a perspective view illustrating a preferred embodiment of the machine, which also illustrates one way of performing the method without the crimping mechanism shown in Fig. 3.

For convenience in describing the operation of the various parts of the machine and the construction thereof, the description will be subdivided under the following headings: (1) General Description; (2) Structure and Drive; (3) Cap Feed; (4) Gasket Feed; (5) Gasket Insertion; (6) Closure Removal; (7) Automatic Gasket Feed; and (8) Operation.

*General description*

The purpose of the present invention is to automatically feed gaskets and to insert them into closures. The terms "closure" and "cap" are used interchangeably herein to refer to the metal part thereof with or without a gasket therein. Preferred types of closures are illustrated in patents numbered 1,909,406 and 2,200,081. The metal closure 6 illustrated in Fig. 5 has a cover 1 and a depending flange 2 with a bead 3 at its lower part. The lower edge 5 in this embodiment is shown turned upwardly into locking engagement with the gasket to hold the gasket in the closure. In some cases the locking operation may be omitted and the gasket permitted to be held in position by an inturned horizontal shelf, as illustrated in Patent No. 1,909,406. The present machine and method are adapted to insert gaskets into closures of either type.

Figures 6, 7, 8:
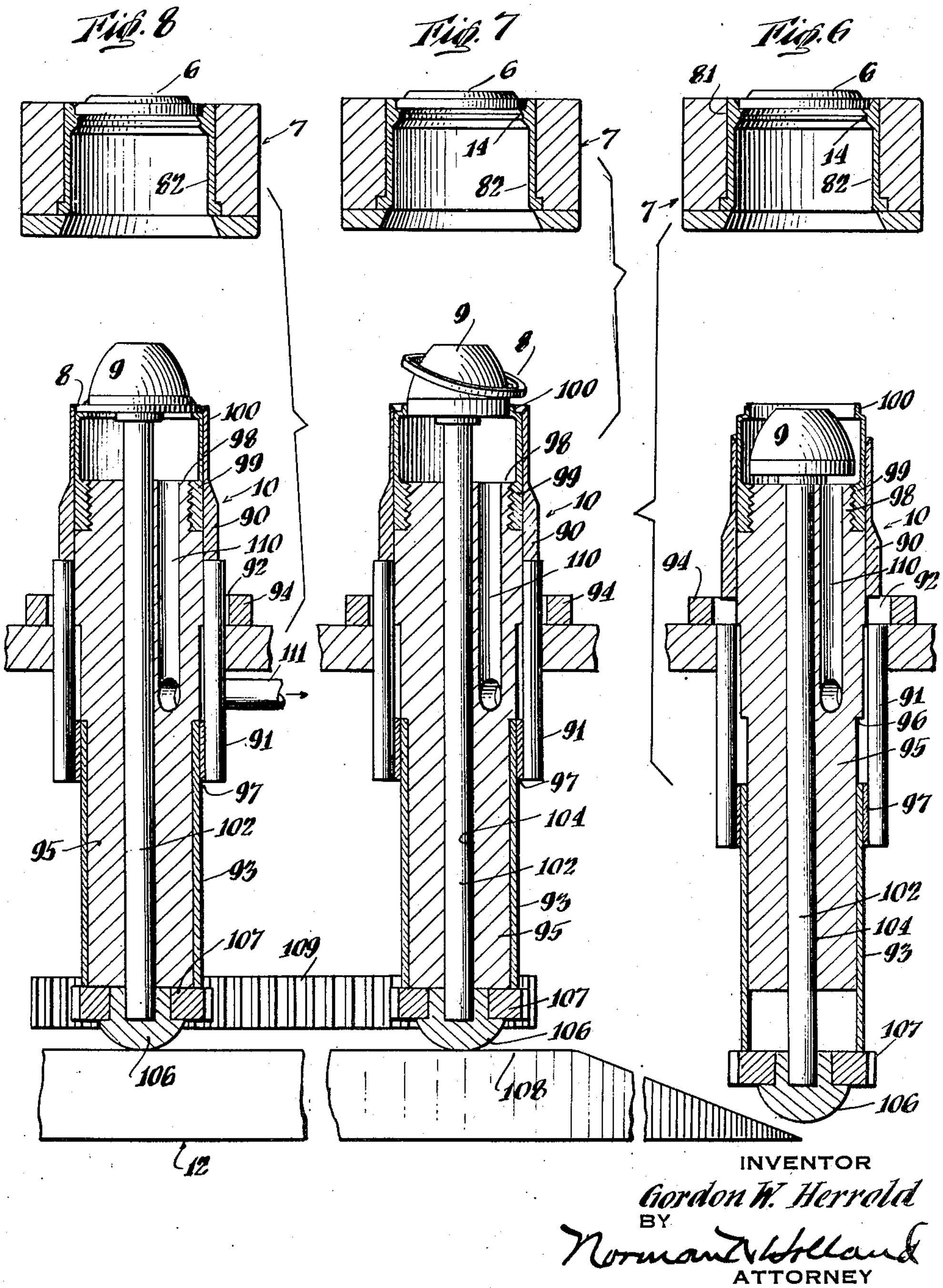
Fig. 6 is a sectional view illustrating the position of the closure cap and gasket holders as a closure cap is fed to a closure cap holder.
Fig. 7 is a view similar to Fig. 6 illustrating the position of the parts as a gasket is fed to the gasket holder.
Fig. 8 is a sectional view illustrating the position of the parts as the gasket is completely seated.

The several operations in the insertion of the gasket into the closure may be observed in Figs. 6 to 11. First the closure 6 is fed to a holder 7 (Fig. 6). Thereafter a gasket 8 (Fig. 7) is dropped over a projecting member 9 of the gasket-inserting mechanism 10. The gasket is drawn down by gravity and by a vacuum until it is forcefully seated, as shown in Fig. 8, whereupon the projecting member 9 is permitted to drop by a cam 12 (Fig. 9). Simultaneously the cap holder 7 is permitted to move downward by a suitable cam 34 (Fig. 3) so that the cap holder drops over the gasket-inserting means, as shown in Fig. 10. The vacuum becomes effective on the cap and holds it firmly on its seat. In doing so, the gasket is forced through a restricted contour 14 into the closure cap. The flange at the lower edge of the closure holds the gasket in position so that the closure holder and the gasket-inserting means may be separated as illustrated in Fig. 11. While the caps may be placed in position on the holders 7 and the gaskets about the members 9 by hand, in the preferred embodiment the closures are automatically fed from a chute to the holders 9 as they pass under the chute on the machine, as illustrated more particularly at station A of Fig. 2 and in Figs. 18 and 19. Likewise the gaskets are preferably fed at station B of Fig. 2 by the mechanism shown in Figs. 15 to 17. A pinwheel 15 pulls gaskets from the chute and drops them into recesses 16 of a rotating disc 43, which moves the gaskets around into registry with the gasket receiver 9 at which an aperture 16 in the rotating disc registers with an aperture in a stationary plate 18 so that the gasket falls through onto the receiver 9.

The present invention goes further and contemplates the automatic separation of the gaskets one by one from a group of gaskets and automatically maintaining a supply thereof in a suitable chute. The mechanism for achieving this objective is illustrated more particularly in Figs. 20 to 27. The gaskets are placed side by side on a series of spindles or rods 19, one of which registers with a chute 20. Suitable means are utilized for forcing the gaskets off the end of the bottom rod to drop in the chute one at a time. The rate of feed of the gaskets by the automatic mechanism is controlled by photo-electric devices or electric eyes 22 and 24.

These several mechanisms will be described in greater detail, and likewise their operation will be described more fully, hereinafter.

*Structure and drive*

Figures 2, 2A:
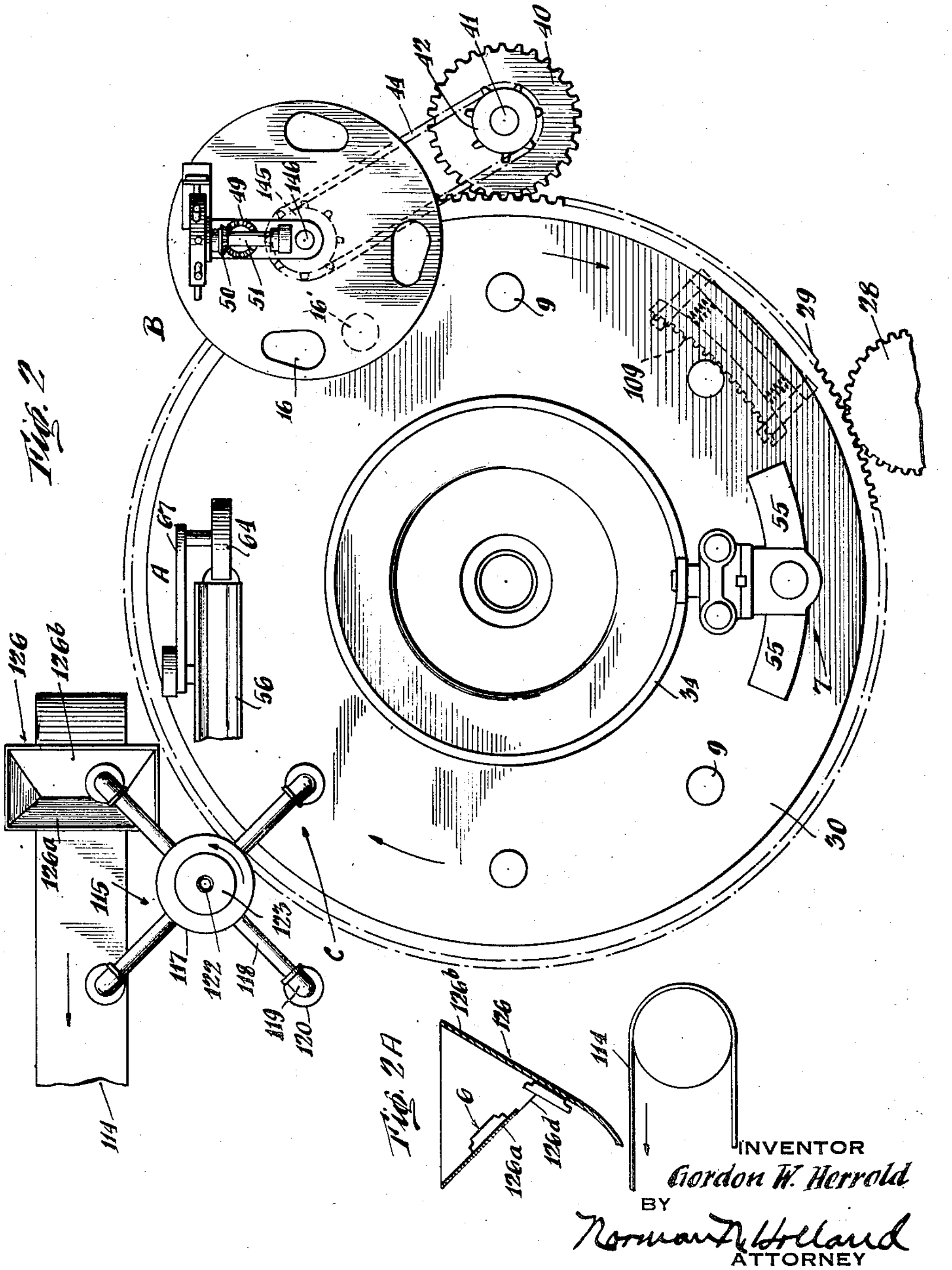
Fig. 2 is a schematic top plan view illustrating the location of various parts of the machine and the stations for the different operations.
Fig. 2A is a fragmentary cross sectional view of a cap receiver for inverting the closures to facilitate inspection thereof.
Figures 3, 4, 5:
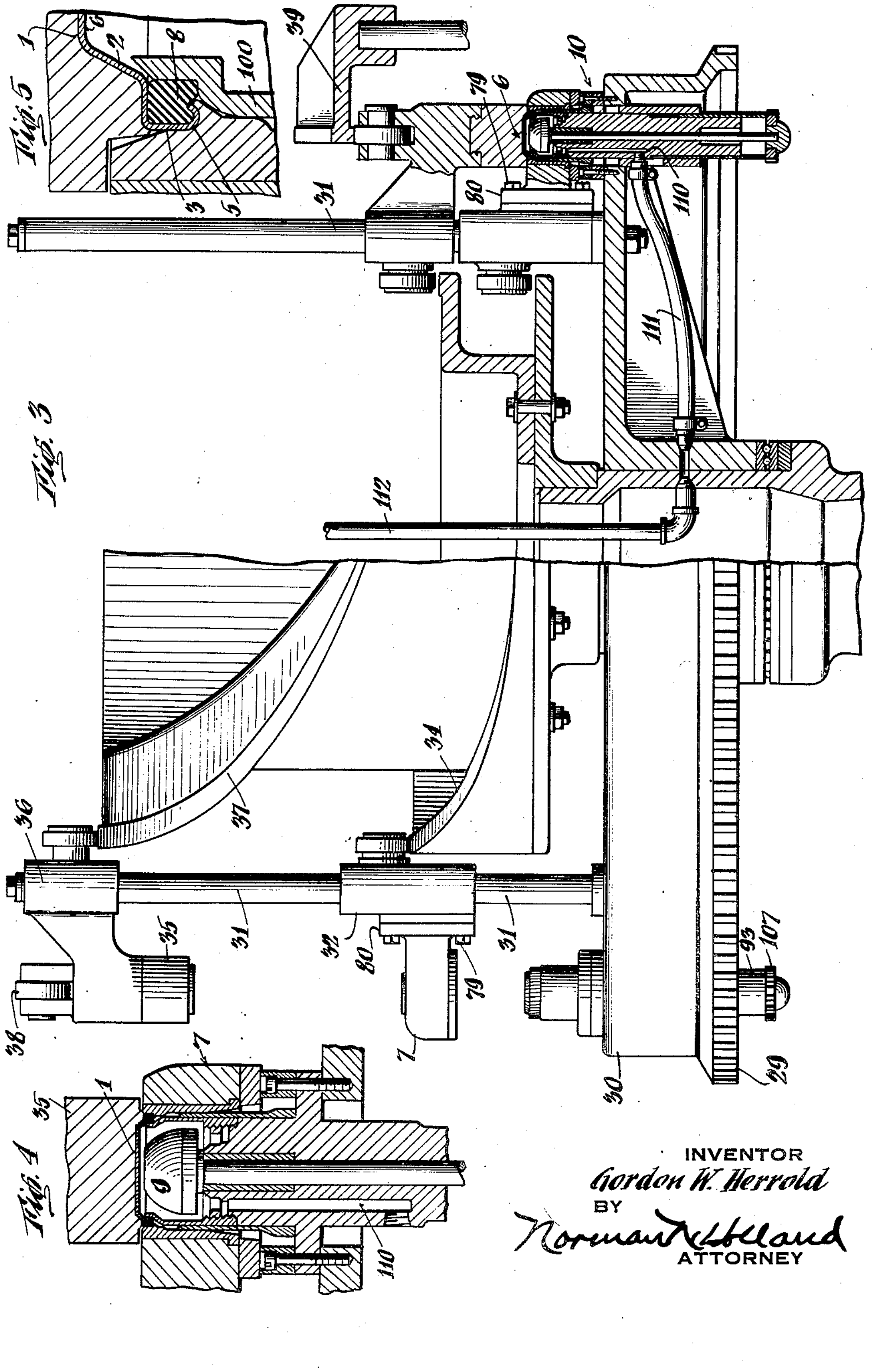
Fig. 3 is a side elevational view, one-half in section, illustrating parts of the machine, including a crimping mechanism for crimping the lower edge of the closure into locking engagement with the gasket.
Fig. 4 is a detailed sectional view through a gasket-inserting mechanism at one stage of the inserting operation.
Fig. 5 is an enlarged fragmentary sectional view illustrating the position of the parts after a gasket has been fully inserted and locked in position by the inturned edge of a closure cap.

Referring more particularly to Figs. 1, 2 and 3 of the drawings illustrating the general structure and drive in the preferred embodiment, there is shown a motor 25 which drives a vertical shaft 26 through the intermediation of the reduction gear mechanism 27. The upper end of the shaft 26 carries a gear 28 meshing with a sun gear 29 disposed about a rotating table 30 of the machine. The table 30 carries the gasket-inserting mechanisms 10 and also the closure heads or holders 7, which are mounted on pairs of vertical rods 31 by slidable sleeves 32. A stationary cam 34 (Fig. 3) fixed to the center of the machine raises and lowers the sleeves 32 on the rods 31 and with them the cap holders 7. An anvil member 35 is also movably mounted on the rods 31 by means of sleeves 36 and is moved up and down by a cam 37. A cam roller 38 is adapted to be engaged by a member 39 (Fig. 3) to create a bumping action which turns in the lower edge of the closure, as shown in Fig. 5, to lock the gasket in position. Where this locking action is not desired, the lower edge of the cap is rolled inwardly into a horizontal flange before it is fed to the machine, and the anvil member 35 and its associated parts are omitted from the machine or fixed in their upper, inoperative positions.

The sun gear 29 drives a gasket-feeding disc 43 for the gasket feed through the intermediation of gear 40, shaft 41, sprocket 42, sprocket chain 44, sprocket 45, and shaft 46. A gear on shaft 46 drives the pinwheel 15 through the intermediation (Fig. 16) of gear 47, shaft 48, bevel gear 49, bevel gear 50, shaft 51 and gear 52 thereon meshing with gear 54 on the shaft of the pinwheel.

Figures 12, 12A:
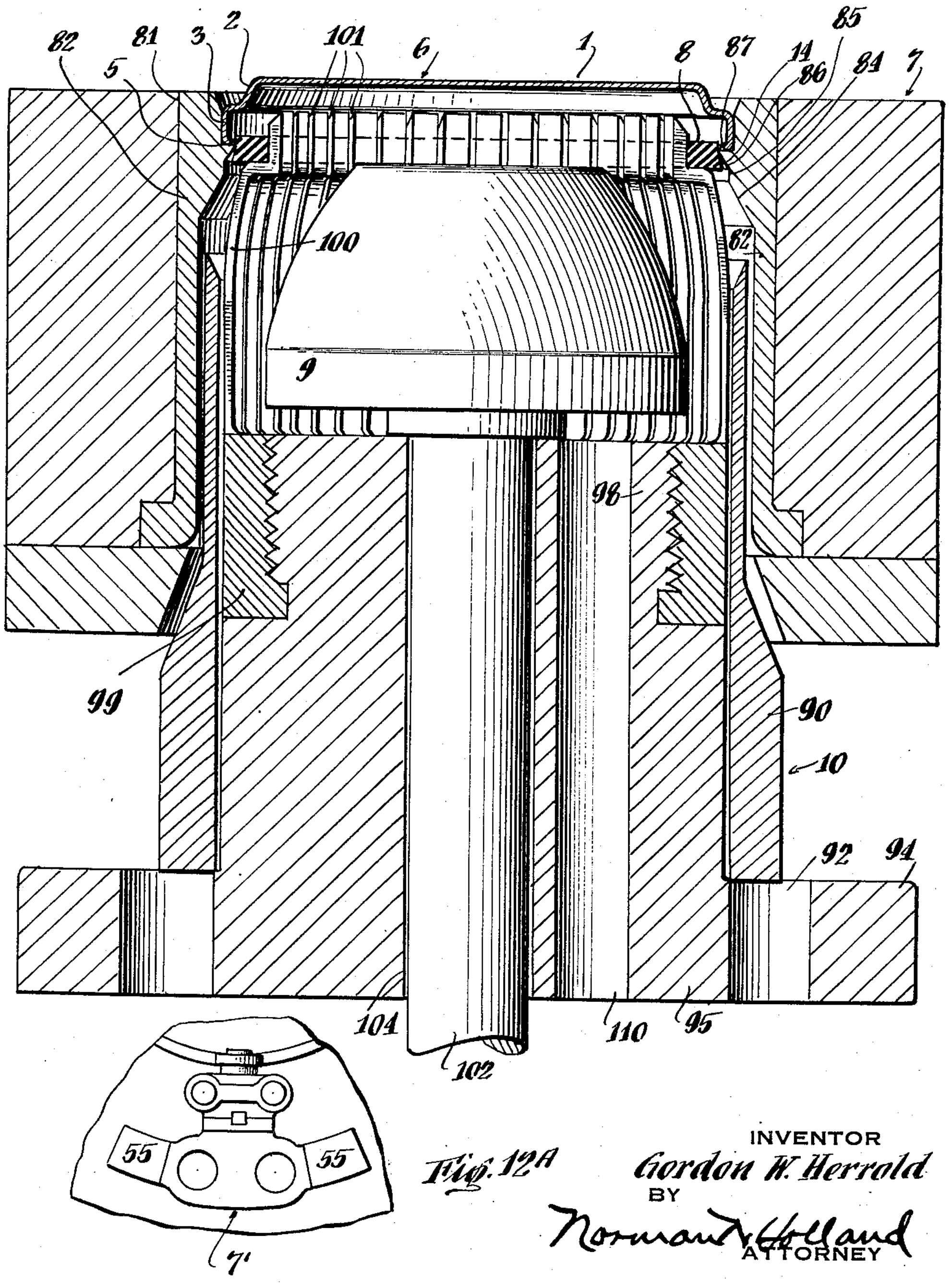
Fig. 12 is an enlarged sectional view showing the position of the parts and the details of the operation of inserting the gasket into the closure.
Fig. 12A shows a form of twin closure holder.

In some instances, generally with closure caps of relatively small diameters, it may be desired to utilize a twin or double closure holder, and in Fig. 12A there is illustrated such a construction 7'. This construction is similar to the closure holders 7 but two caps instead of one cap may be carried up and down by the twin head for insertion of gaskets. Twin gasket insertion members will also be used to insert two gaskets simultaneously into the two closures carried by the double head 7'.

*Cap feed*

The preferred embodiment of means for feeding the closures to the machine is illustrated in Figs. 1, 2, 18 and 19. Before discussing this mechanism, it is to be noted (Fig. 1) that the members 7 which constitute the closure holders have arms or brackets 55 bolted to each side. The ends of these arms abut the ends of adjoining arms and form a smooth surface when the members 7 are in horizontal alignment, as shown in Fig. 1. These members are in horizontal alignment in their upper cap-receiving position and present a smooth surface as they pass under the cap feed.

Figures 18, 19:
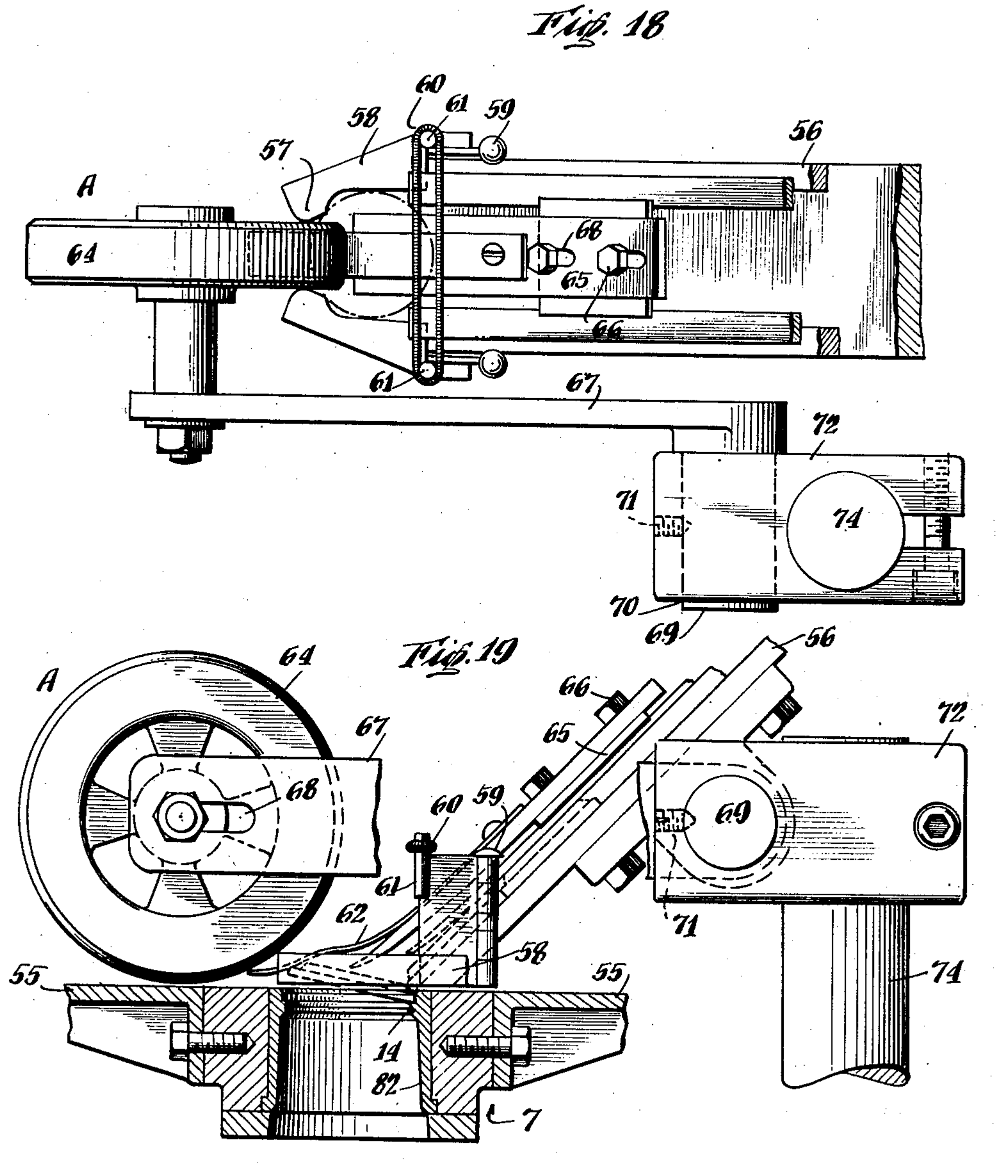
Fig. 18 is a fragmentary top plan view illustrating closure cap feeding means for delivering closure caps to the machine.
Fig. 19 is a side elevational view of the mechanism shown in Fig. 13, showing the delivery of a closure cap to its seat.

The caps may be fed to a chute 56, inclined sufficiently so that they will slide down the chute by gravity. The lowermost cap in the chute slides down until its front end engages the inwardly projecting parts 57 of fingers 58 pivoted on the vertical pins or shafts 59. These pins are held in their inner positions by means of a tension spring 60 fitting about posts 61. The fingers 58 resiliently retain the cap against further movement, as shown more particularly in Fig. 18, so that the edge rides on the upper surface of the members 55 until the rear part is caught by the side of the opening in the cap holder 7, as shown in Fig. 19, whereupon the cap is forced forward. The forward end is prevented from moving upwardly by a spring 62 and hence forces the fingers 58 outwardly. The cap is also forced downwardly by the spring 62 and by a pressure roller 64 so that the cap is seated firmly in its seat just above the restricted surface 14. The spring 62 is mounted on a member 65 held in position by bolts 66 fitting in suitable slots so that the spring may be adjusted to secure the best operation. Likewise the wheel or pressure roller 64 is mounted on the end of an arm 67 in slots 68 so that it may be adjusted for best results. The arm 67 has a stub shaft 69 on its end fitting into a bearing 70 and held in position by a set screw 71. The bearing 70 is mounted on a sleeve 72 carried by a vertical rod 74. Thus caps are fed consecutively to the cap heads or holders 7 and forced firmly down onto the seats therein.

*Gasket feed*

Figures 16, 17:
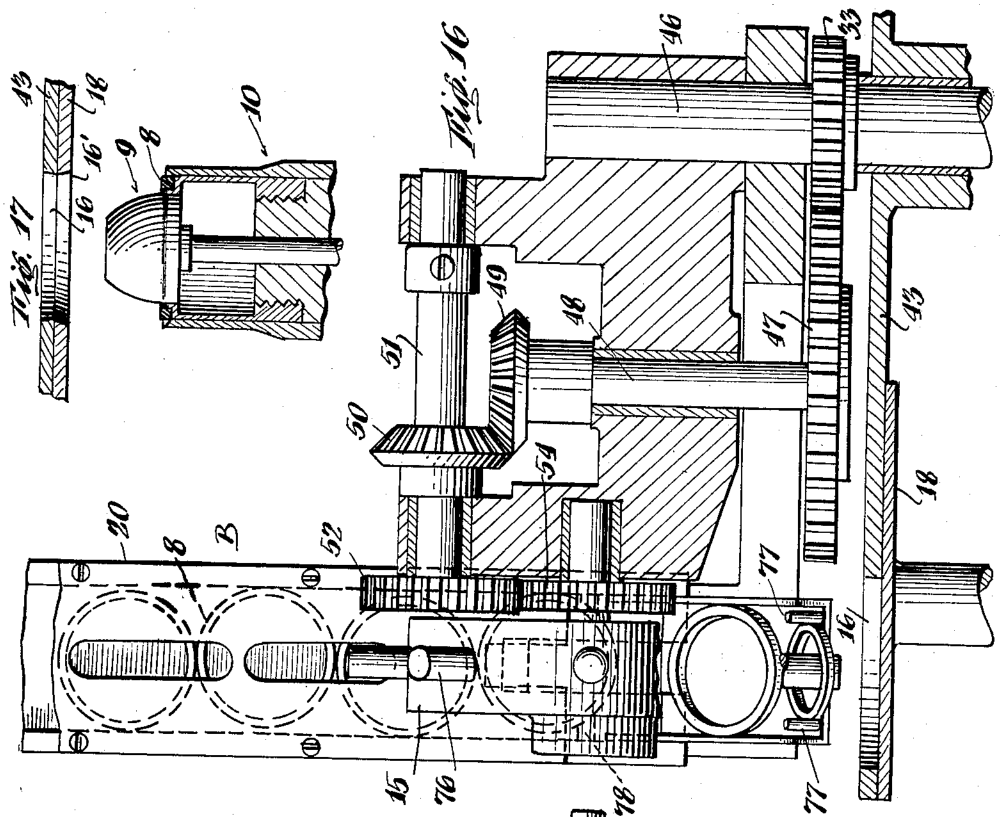
Fig. 16 is a view, partially in section, of the gasket-feeding mechanism illustrating additional features.
Fig. 17 is a fragmentary view illustrating the aperture in the rotating disc to which the gaskets are fed, the aperture registering with the aperture in the stationary plate beneath it, and also showing the gasket guide or holder.
Figure 15:
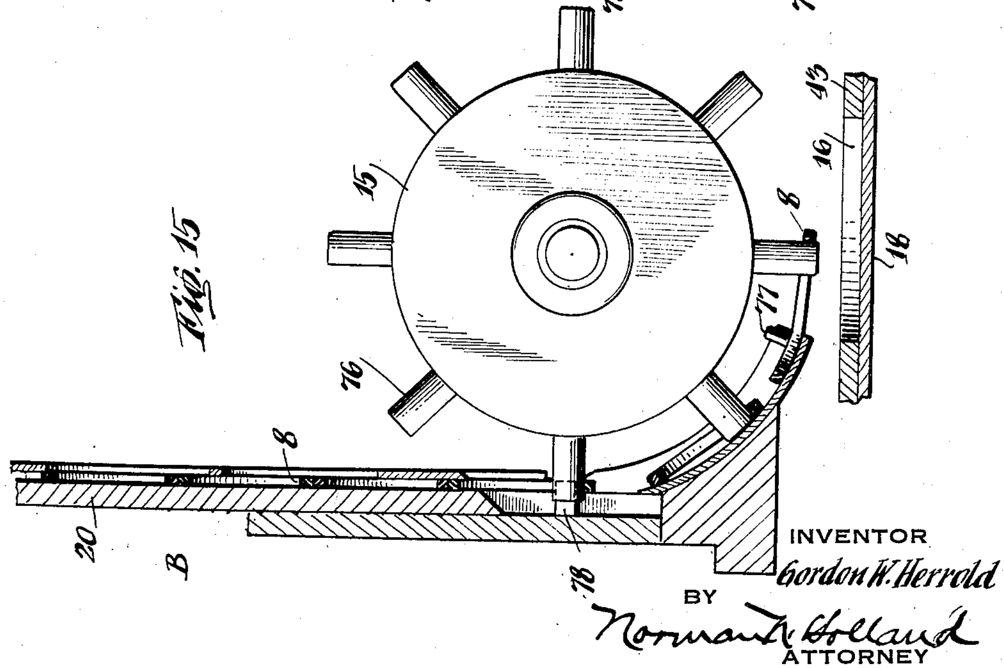
Fig. 15 is a sectional view illustrating the removal of gaskets, one at a time, from a chute.

The device for feeding gaskets, which is described separately herein from the automatic gasket feed, is shown more particularly in Figs. 2, 15 and 17. The gaskets are fed to a substantially vertical chute 20 either by hand or by the automatic gasket feed. Stops 78 on opposite sides of the lower end of the vertical part of the chute hold the bottom gasket in position to be engaged by a pin 76 in the pinwheel 15. The gasket is pulled between the stops 78, carried along the arcuate portion of the chute and then pulled out of the chute between pins 77 mounted at the end of the chute. Each gasket is dropped into a recess 16 of a rotating disc 43 on shaft 46.

Preferably the recess is elongated, as shown in Fig. 2, so that exact registry is not necessary. The gasket is dropped into the enlarged portion at the forward end of the recess, and as the disc rotates the gasket slides back on the supporting member 18 to the rear of the recess. As the rotating disc moves further around, the projecting member 9 (Fig. 1), forming a part of the gasket-inserting mechanism 10, registers with an aperture in the supporting plate 18 at the same time that the aperture 16 in the rotating disc registers with it; hence the gasket is dropped onto the member 9, as shown more particularly in Fig. 7.

The rotating disc 43 is mounted on the vertical shaft 46 and is driven from the sun gear 29 (Fig. 1) by means of the gear 40, sprocket 42, sprocket chain 44, sprocket 45, shaft 46, and the apertures 16 therein are synchronized with both the pins 76 on the pinwheel and the gasket-receiving member 9 forming a part of the gasket-inserting means.

The pinwheel 15 may be driven from the shaft 46 by means of gear 54 on the pinwheel shaft, gear 52 on shaft 51, bevel gear 50, bevel gear 49 on shaft 48 and gear 47 meshing with gear 33.

Thus the gaskets are fed from the chute to the recesses 16 in the rotating disc 43. When the rotating disc 43 meshes with the delivery aperture in the supporting plate 18, one of the members 9 of the gasket-inserting mechanism is below the aperture and the gasket falls through onto one of the members 9.

The automatic gasket feed for feeding gaskets to the chute will be described hereinafter.

*Gasket insertion*

The insertion of a gasket in a closure is illustrated more particularly in Figs. 3 to 12. In describing the construction, the cap holder will be first explained, then the gasket holder, and finally the operations.

Referring more particularly to Figs. 6 to 12, the cap holder comprises a head 7, shown in more detail in Fig. 1, which has brackets 55 on the sides thereof so that when the holders are in horizontal alignment a continuous race or track is provided interrupted only by the seats for the closures.

The heads 7 are mounted on the sleeves 32 carried by the vertical rods 31. Any suitable means may be utilized for the mounting, here shown as bolts 79 in the flange 80. Thus the member 7 may be raised and lowered by the cam 34. A cylindrical aperture 81 in the head receives a bushing 82 with a lower internal cylindrical portion leading to the constricted portion 14 (Fig. 12) which preferably comprises an inclined portion 84 leading to a substantially cylindrical portion 85 which in turn is surrounded by an inwardly inclined portion 86 having a flat upper surface 87 adapted to seat the lower edge of the closure. The inner bushing 82 is made of a metal which may be machined and which will resist wear.

The gasket holders are shown in Figs. 6 and 12 in position directly under the heads 7. The preferred embodiment illustrates an outer sleeve portion 90 whose lower position is fixed by member 94. Members 91, which are adapted to pass through suitable slots 92 in the member 94 may move upwardly with respect to the table and move the sleeve 90 upwardly. The members 91 are secured to a collar 97 force-fitted about a cylindrical member 93 which is moved vertically by cam 108 to raise and lower the sleeve 90.

An inner member 95 extends within the sleeve 90 and is fixed to the member 94 resting on the table. The upper end of the member 95 is reduced at 98 and threaded to receive an interiorly threaded member 99. The member 99 is adapted to seat the gasket at 100. Preferably the member 99 is formed of a series of spring fingers 101 (Fig. 12) offset at their upper ends to form the seat 100. These individual fingers are preferably made of spring steel and are spaced sufficiently far apart, about one thirty-second of an inch in the preferred embodiment, to collapse inwardly sufficiently to permit the gasket to be constricted thereon during the inserting operation. The outer position of the fingers may be limited to some extent by the outer sleeve 90, but they are preferably constructed to retain, without external support, the proper maximum size. Preferably also the fingers 101 are formed integrally with the member 99.

A gasket guide 9 is mounted on a rod 102 extending through a central bore 104 in the member 95. The lower end of the rod 102 is bolted to a cam rider 106 which has a gear 107 forming a part of it. When the member 106 engages a cam 108, the rod 102 is moved upwardly as shown in Figs. 7 and 8 so that the guide 9 on the upper end thereof is in a position to receive a gasket and guide it down into the seat 100. The member 106 also moves upwardly with it a cylindrical member 93, which slides about the member 95 carrying with it members 91 which engage and raise the sleeve 90 until the upper end thereof is substantially flush with the gasket seat 100. Preferably the top of the cam 108 is such that the upper ends of the spring fingers are substantially flush with the inwardly tapered surface at the upper end of the member 90, the gasket being in effect supported on three sides. To facilitate seating of the gasket, the gear 107 engages the segmental gear 109 (Figs. 1, 2, 7 and 8) so that the guide 9 is rotated. To further secure accurate seating of the gasket and the removal of irregularities, if any, therein, the space within the holder 90 is subjected to a vacuum by means of the conduit 110 operatively connected to a rubber hose 111 (Fig. 3) which is connected in turn through the frame of the machine to a pipe 112 leading to a suitable source of vacuum. It will be understood, of course, that the fit between the rod 102 and the central bore 104, and the fit between the inner surface of the member 90 and the outer surface of the member 99, are sufficiently close so that the vacuum may be effective. The gasket in effect forms a seal over the slots at the upper ends of the spring members and the central portion is closed by the guide head 9, so that the vacuum securely holds the gasket in position. When the cap head drops over the inserting device, the vacuum tends to hold the cap securely in position. Thus the gasket is positively held during the inserting operation, and any irregularities in the gasket due to storage or other conditions will not interfere with proper assembly of the gasket in the closure.

In operation, starting with the position shown in Fig. 6, where the cap has already been placed on its seat in the holder 7, the cap holder and gasket holder are each separated a substantial extent. In moving from the position shown in Fig. 6 to that shown in Fig. 7, the cam rider 106 rides up on the cam 108 to raise the rod 102 and guide member 9 at the upper end thereof to the position shown in Fig. 7. In this position the domed surface on the guide member 9 leads down to the seat 100 for the gasket. Simultaneously the sleeve 90 is moved up by the members 93 and 91. At this point the gasket is dropped over the domed guide 9 either by hand or preferably by the feeding means described hereinbefore. The vacuum through the conduit 110 is effective and tends to draw the gasket down on its seat. Likewise the gear rack 109 is effective on gear 107 to rotate the guide member 9 which further aids in centering and moving the gasket toward the seat. When the parts reach the position shown in Fig. 8, the gasket has been seated and is held in position by vacuum. The cam rider 106 is moving along the horizontal portion of the cam 108. At this point the cap holder 7 begins to move downwardly on the inclined portion of the cam 34. The cam rider 106 approaches the end of the cam 108 and permits the domed guide 9 to drop to the position shown in Fig. 9. The cap holder continues to move downwardly and reaches the position shown in Fig. 10. The position shown in Fig. 12 is just prior to that shown in Fig. 10 and illustrates the gasket being inserted past the flange of the lower edge of the cap. As the gasket moves past the constricted portion 14 it is constricted inwardly and its inner periphery constricts the fingers 101 inwardly. Thus the gasket at all times is being forced outwardly by the resilient fingers and when it passes the upper part of the constricted portion 14 it is expanded outwardly into the skirt of the cap. The pressure applied to the inner periphery of the gasket by the spring fingers 101 forces the gasket firmly in position and assures the elimination of any irregularities and a secure seal when the closure is applied to a container. The head 7 then moves upwardly with the assembled closure and gasket to the position shown in dotted lines in Fig. 11.

The above operations produce a closure in which the gasket is held by an inturned edge at the bottom of the closure, as shown in Fig. 12. The embodiment in Fig. 1 is adapted to perform the above operations. In some cases it is desirable that the gasket be locked in position so that regardless of the rough handling to which it may be subjected it will not come out of the closure. In addition, there is some tendency for the gasket, when forced on a closure, to twist around. The locking of the gasket in position resists this tendency and also protects the raw edge of the metal against rusting. Where the gasket is to be locked in position, it is not essential that the lower edge of the cap be turned into a complete flange, although it may be so formed if desired. A slight "coaxing" of the lower edge is usually desirable in order to facilitate turning the edge inwardly, but a complete flange is not necessary.

The locking operation is shown more particularly in Figs. 4 and 5. The parts are the same as illustrated in Figs. 6 to 12, but pressure is applied to a member 35 which fits down over the closure, as shown in Figs. 4 and 5. The movement of the member 35 is controlled by the cam 37 so that it moves down on the head 7 which holds the closure. After the gasket has been inserted within the closure, the cam roller 38 on the upper part of the member 35 goes under an anvil 39 (Fig. 3, right side) which forces the parts down by a sort of bumping action which turns inwardly the lower edge of the closure and in doing so embeds the edge in the lower side of the gasket, as shown more particularly in Fig. 5, to lock the gasket in position. To facilitate the inward bending of the edge, it is desirable that an annular groove be formed on the upper shelf of the restricted surface 14 which will assist in coaxing and guiding the edge of the closure inwardly, as shown in Fig. 5.

*Closure removal*

The closures, after the gaskets are assembled in them, continue to move about the machine and also to move upwardly as shown in Fig. 11 until the closure-holding members are in their upper position, retained thereat by the horizontal portion of the cam 34. This upper position may be noted at the upper right side of Fig. 1 and also at the upper left side of Fig. 1 where one of the arms of the closure-removing device is shown.

Figures 13, 14, 14A:
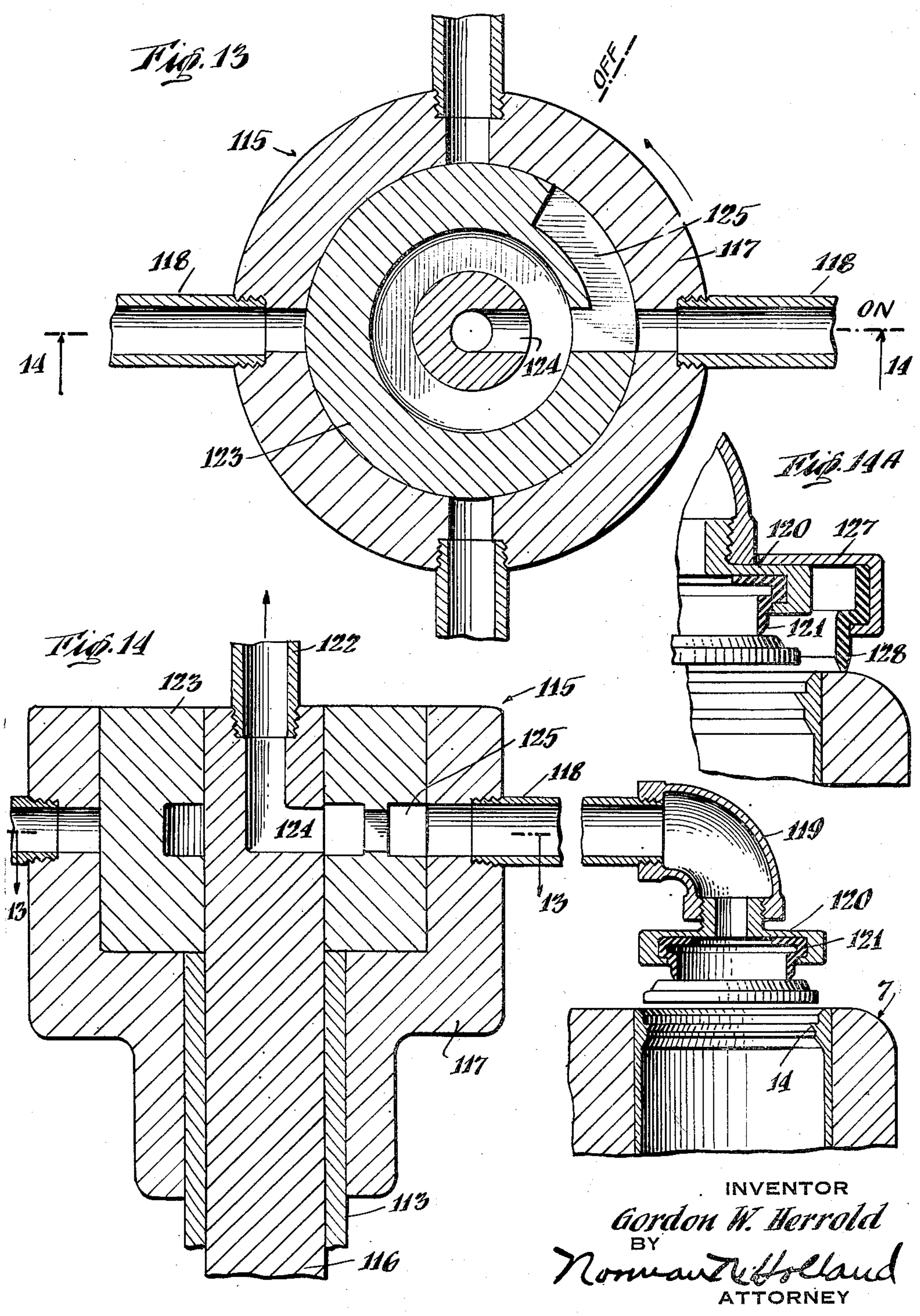
Fig. 13 is a horizontal sectional view of the mechanism for removing a closure, with a gasket assembled in it, from the machine.
Fig. 14 is a vertical sectional view of the closure-removing mechanism illustrating a closure being removed from a holder.
Fig. 14A is an enlarged fragmentary view illustrating details of a modified form of closure pickup.

While any suitable device may be utilized for the purpose, a preferred embodiment is illustrated in Figs. 13 and 14, and the position of the device is shown in Fig. 2. The purpose of the device is to raise the closures from the seats in the heads 7 and transfer them to a conveyor 114. The cap-removing device is indicated generally at 115 and may comprise a stationary central shaft 116 with a rotating driving sleeve 113 having a head 117 thereon. A plurality of arms 118 are threaded into the rotatable head and are provided at their opposite ends with an elbow 119 having a head or cup-shaped supporter 120 threaded to its lower end. The head may comprise a cup-shaped member with an inturned flange at its lower edge housing a cup-shaped rubber member 121. The lower lip of the cup-shaped member is adapted to contact the cover part of the closure cap when a vacuum is applied to it. In Fig. 14 the closure is shown drawn up against the cup-shaped member just after it has registered with a closure in a head 7.

In order to apply a vacuum to the arms as they register with the closures in the moving heads 7, the upper end of the shaft 116 has a vacuum conduit 122 threaded thereto. The conduit extends down as shown at 124 to a port 125 (Fig. 13) in the vacuum control bushing 123. When the cup 121 registers with the closure, the arm 118 has registered with the beginning of the port 125 and continues to register with the port until the head 121 is over one side of the inverter 126 which in turn is over the conveyor 114. The cap inverter 126 is shown more particularly in Fig. 2A. The cap 6 is dropped on the left side 126*a* of the inverter and slides onto the opposite side 126*b* by which it is inverted and delivered through the opening 126*d* onto the conveyor 114 bottom-side up, which facilitates inspection.

The cap-removing device 115 is shown with four arms and rotates continuously, but additional arms may be utilized if desired.

In order to raise the closure out of its seat in the head 7, it is necessary that the cup 121 be a slight distance above the closure and above the upper end of the head 7. A slightly greater vacuum is necessary in order to pull the cap up this distance. In operation the construction illustrated in Fig. 14 has proven satisfactory. In the event that a cap with a taller skirt or one made of heavier metal renders the cup 121 less effective, a modification shown in Fig. 14A may be utilized. In the modification, a cup-shaped member 127 is telescoped over the cup supporter 120 with a second cup-shaped member 128 made of rubber supported within it. The member 127 is free to rise and may be of sufficient length to scrape the upper end of the member 7 when it registers with the closure. The atmospheric air below the closure with a vacuum above it will raise the closure into contact with the cup-shaped member 121. The member 128 will, of course, have a diameter slightly greater than the closure and slightly greater than the opening in the member 7.

The closure-removing device will pick up the respective closures as they are presented by the machine and drop them into the inverting device leading to the conveyor. The closures will be received in inverted position on the conveyor and may be readily inspected. The conveyor may deliver the closure to a suitable carton or to a suitable stacking device.

*Automatic gasket feed*

The automatic gasket feed is illustrated more particularly in Figs. 20 to 27. As described hereinabove, the gaskets may be fed to the machine by hand or they may be fed to the chute leading to the pinwheel by hand. The preferred embodiment contemplates the use of an automatic feed for delivering gaskets one at a time to the vertical chute leading to the machine and to control the feed so that the gaskets will be delivered to the chute at a rate corresponding to the use of gaskets by the machine.

Figure 20:
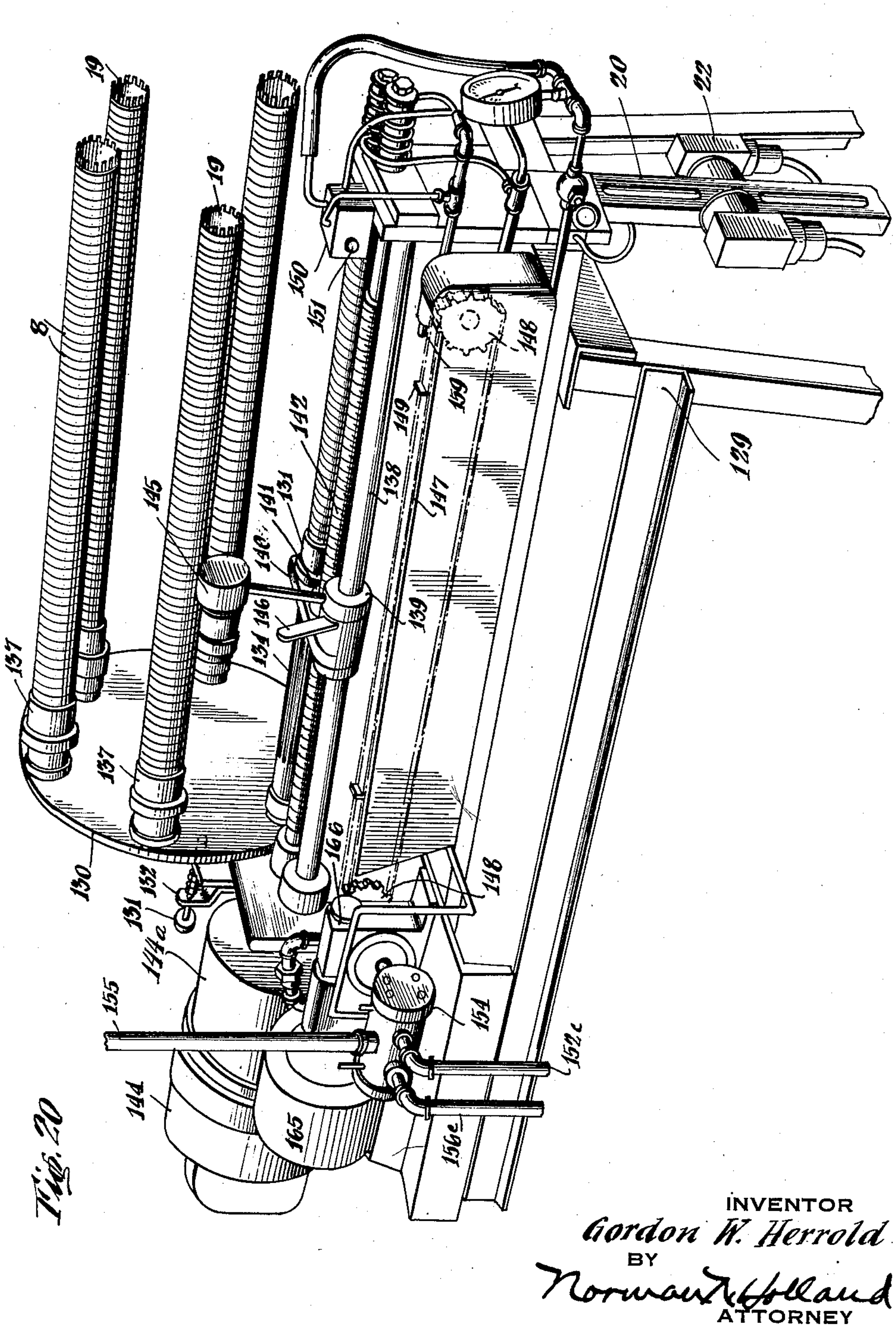
Fig. 20 is a perspective view illustrating the automatic feed for gaskets whereby gaskets are separated from each other and fed one at a time into a chute leading to the gasket feed at the inserting machine.
Figures 21, 22, 23, 24:
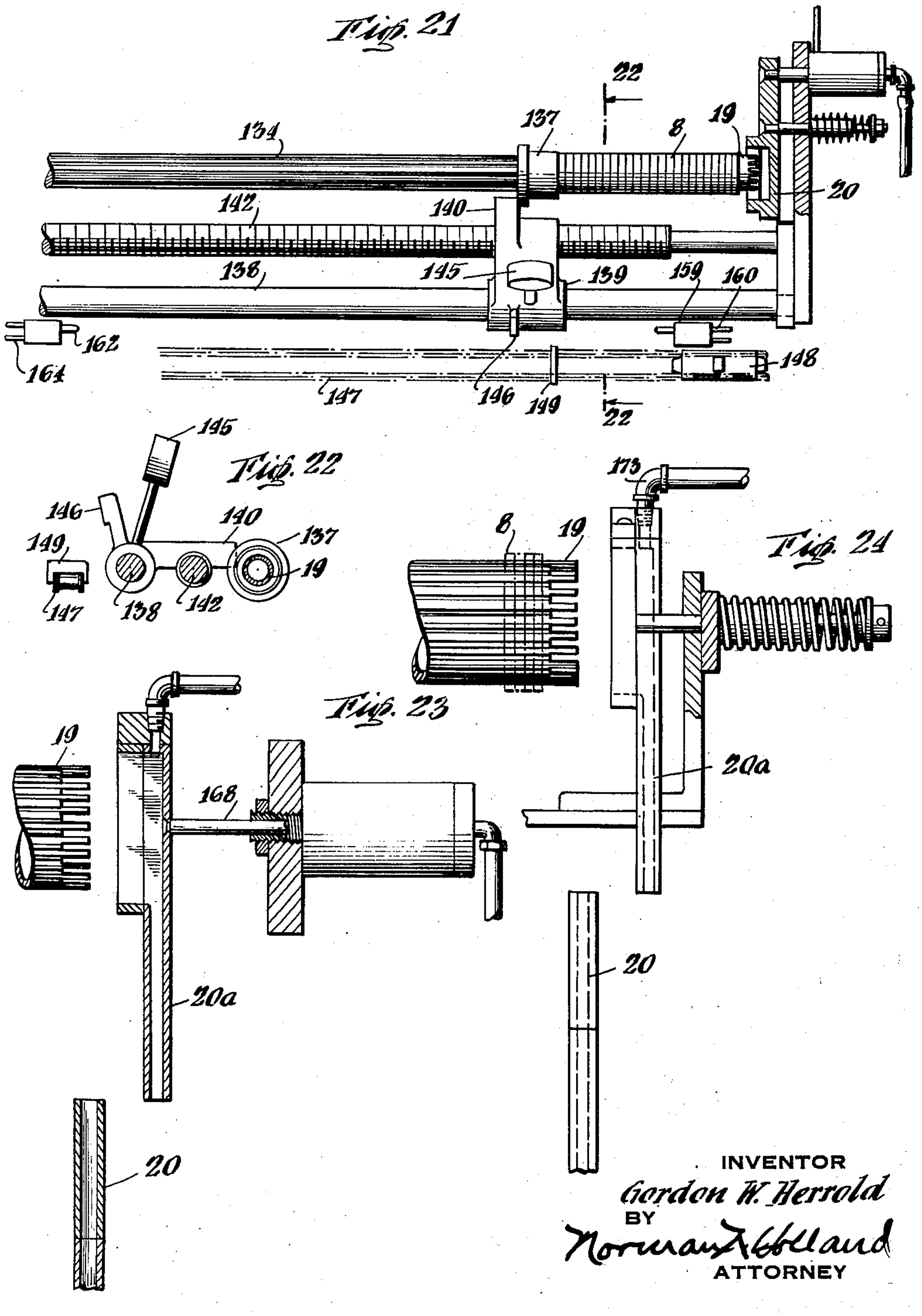
Fig. 21 is a fragmentary top plan view illustrating features of the mechanism shown in Fig. 20.
Fig. 22 is a sectional view along the line 22—22 of Fig. 21 illustrating the mechanism for moving gaskets along a spindle.
Fig. 23 is a fragmentary sectional view illustrating the end of the chute moved out of registry with the spindle or rod supporting the gaskets in order to permit the substitution of another spindle.
Fig. 24 is a side elevational view, partly in section, of the mechanism shown in Fig. 23 illustrating additional features.

The general structure of the automatic gasket feed is illustrated more particularly in Fig. 20 where an automatic feeding device is mounted upon a frame 129. A rotatable disc 130 is provided with a plurality of spindles 19 thereon. The disc may be rotated about a center mounting so that the lower spindle registers with the upper end of the chute 20. The disc 130 is shown resiliently held in this position by means of a pin 131 resiliently mounted on a bracket 132 to press against the disc 130 and to engage depressions therein resiliently holding the disc in position where one of its spindles 19 registers with the top of the chute 20. The spindles 19 have a series of grooves and ribs 134 extending longitudinally of the surface thereof. These grooves and ribs facilitate the application of gaskets to the spindles and the removal of them from the spindles.

Figures 25, 26, 27:
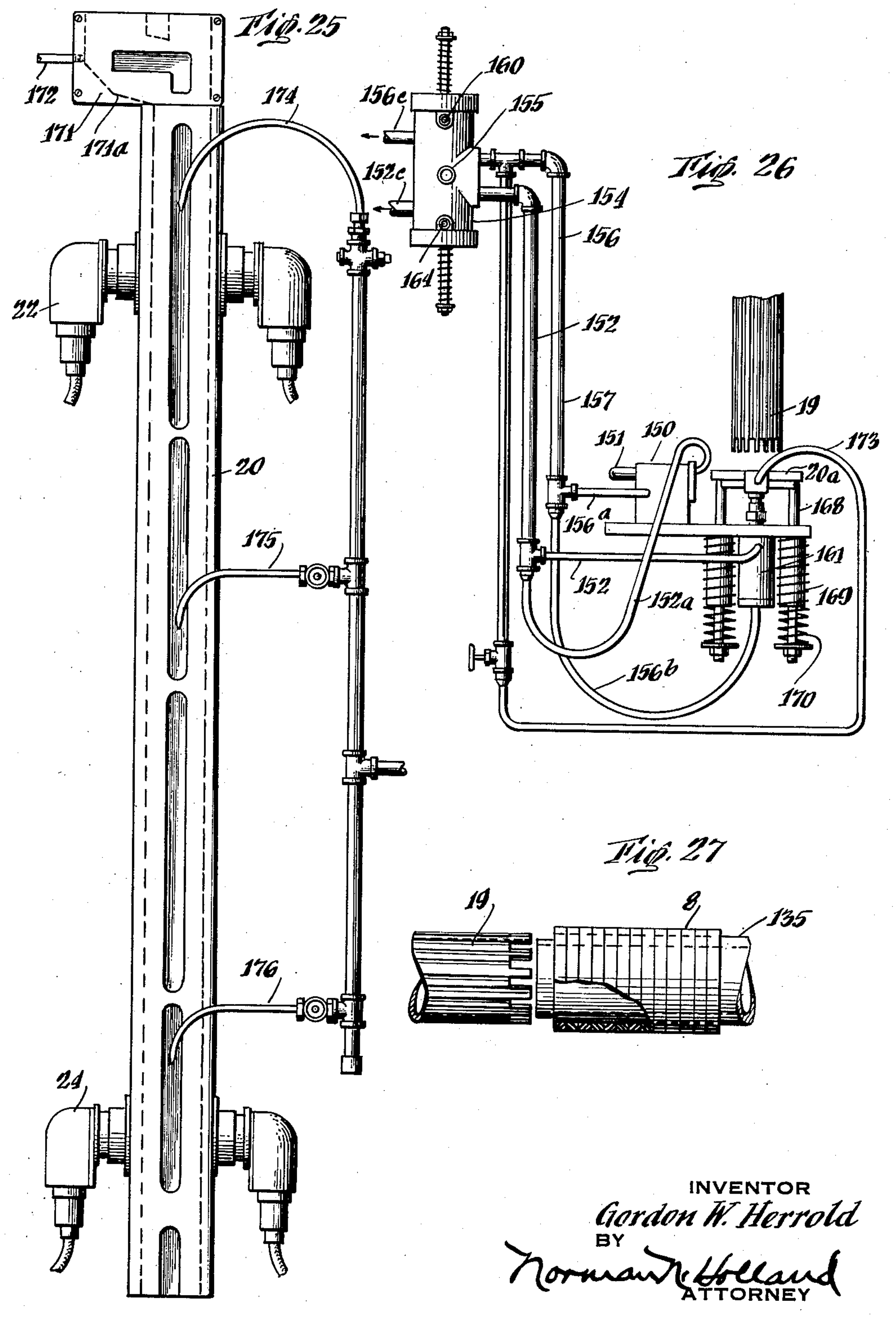
Fig. 25 is a front view of the chute for the gaskets illustrating electric eyes or photo-electric devices for regulating the feeding of the gaskets to the chute responsively to the quantity therein.
Fig. 26 is a diagrammatic top plan view illustrating compressed air connections to the several air cylinders.
Fig. 27 is a side elevational view illustrating the loading of a series of gaskets onto a spindle of the automatic gasket feed.

Gaskets of the type illustrated herein are normally cut from a tube placed upon a mandrel. As illustrated in Fig. 27, the gaskets may be forced off the mandrel 135 directly onto a spindle 19. It will be understood, of course, that the gaskets may be applied to the spindles 19 in any other suitable manner, but this is a convenient way of doing it. A sleeve member may be utilized for forcing the gaskets off a mandrel onto a spindle or they may be removed from one to the other in any other suitable way. If desired, the gaskets may be stored on tubes of suitable diameter and removed from the tubes onto the spindles 19.

In order to feed the gaskets from a spindle into the vertical chute 20, the gaskets are forced by means of a sleeve 137 mounted at one end of a spindle 19 so that they drop off one at a time into the chute. Each spindle 19 has a sleeve 137 thereon. The preferred embodiment of the invention provides means for automatically moving a sleeve 137 at a proper speed to deliver the gaskets at the proper rate.

The mechanism utilized for this purpose may comprise a carriage 139 mounted on a rod 138. The carriage has a cross member 140 which engages back of the sleeve 137 on the spindle registering with the chute, as shown more particularly in Fig. 20. This cross member 140 also has a threaded part in the form of the inside of a half cylinder which fits on the threaded driving shaft 142. As the threaded driving shaft 142 is rotated in the proper direction, the carriage 139 and cross member 140 are moved and in turn move the sleeve 137 to force the gaskets along the spindle 19, causing them to drop off one at a time into the chute 20. A motor 144, through the intermediation of a suitable reduction gear mechanism 144*a*, is operatively connected to drive the threaded shaft 142.

Preferably the motor has two speeds, one slightly greater than that required to feed gaskets to the inserting machine and the other slightly less than the rate required to feed gaskets to the inserting machine. The speed of the motor is controlled by a pair of photo-electric devices or electric eyes 22 and 24 (Fig. 25). The upper electric eye shifts the motor to its slower speed when the gaskets reach the level of it, and the lower electric eye 24 changes the motor to its higher speed when the gaskets are below the lower electric eye. In this way the supply of gaskets is maintained at a level intermediate the levels of the two electric eyes. If the gasket-inserting mechanism is stopped for any reason, the motor is also stopped. This may be done by a separate push button or automatically when the gasket-inserting machine is stopped.

The sleeve or carriage 139 has a counterweight 145 and also an arm 146 thereon. When the sleeve 139 reaches the end of its travel and has removed the gaskets from one of the spindles 19, it can be moved to the left by raising the cross member 140 either by the arm 146 or the counterweight 145 and shifting the sleeve 139 to the opposite end. This, however, would be a somewhat cumbersome operation for the operator and would slow down the operation of the machine. The preferred embodiment provides automatic means for shifting the carriage 139 to the left on its return movement. This is achieved by means of a sprocket chain 147 mounted on sprockets 148 and having a plurality of upright members or lugs 149. When the counterweight is moved over so that the arm 146 drops onto the chain 147, the cross arm 140 is raised out of engagement with the threaded drive shaft 142 and the arm 146 rests upon the chain and is moved to the left by engagement with a lug 149. In order to raise the cross arm 140 and cause the arm 146 to drop onto the chain 147, an air cylinder 150 is provided having a pin 151 adapted to move out and push the arm of the counterweight 145 over its dead center so that it will fall until stopped by the engagement of the arm 146 with the chain 147. The air cylinder 150 is operated by an air line 152 (Fig. 26) connected with an air valve 154 and having a branch line 152*a* leading to one side of the cylinder 150. The air valve 154 has a piston within it and a pressure line 155 leading to it. When the piston is moved in one direction, the air line 155 is connected to the air line 152 leaving the air valve, and when moved in the opposite direction the pressure line is connected to the air lines 156 and 157.

The air valve 154 likewise connects the pipe 156 to atmosphere through pipe 156*c* when moved in one direction and the pipe 152 to atmosphere through pipe 152*c* when moved in the opposite direction. The pipes 152*c* and 156*c* may be connected to a suitable exhaust instead of to atmosphere, if desired.

When the sleeve 139 reaches the right end of its travel, it engages a trip 159 (Fig. 20) which directs air through pipe 160 into one end of the air valve 154, shifting the valve therein to the right and directing air from the pressure line 155 through the pipe 152 and branch 152*a*, causing the pin 151 to shift the counterweight over and cause the arm 146 to rest on the chain 147. Simultaneously air is directed through the branch 152*b* into the cylinder 161 to shift the upper end of the chute 20 out of registry with the spindle 19, which will be described in more detail later. This enables the operator to rotate the disc 130 until another spindle is in line with the chute 20.

Meanwhile the chain 147 is carrying the sleeve 139 back to its initial position. When it reaches its initial position, the sleeve engages another trip valve 162 which forces pressure through the pipe 164 leading to the opposite end of the control valve 154 whereupon the valve therein is shifted to the left, cutting off the pressure from the pipe 152, opening these pipes to atmosphere, and connecting the pressure line 155 with the pressure line 156. The pressure line 156 has a branch line 156*a* which connects with the cylinder 150 and returns the pin 151 to its retracted position. The air line 156 also has a branch line 156*b* leading to the cylinder 161 which forces the piston therein to the opposite side moving the upper end of the chute into registry with the chute 20 and into position to receive the gaskets about to be forced off a spindle 19.

The operator may return the cross member 140 to its effective position, or if desired a device similar to the cylinder 150 may be provided and connected to the branch pipe 156 for returning it to its proper position. Likewise a suitable cam or incline may be provided for engaging the arm 146 for raising it sufficiently to permit the counterweight 145 to carry the cross arm 140 to its position. In the use of a cam the lugs 149 should be high enough so that the arm will not disengage these lugs until after the counterweight 145 has passed dead center in returning the cross arm 140 to its effective position.

The chain 147 may be driven in any suitable manner, for example by a separate electric motor 165 connected to it through a reduction gear 166.

As the gaskets drop off the end of a spindle 19, they must find their way into the chute 20. Thus the chute has to be in registry with the end of the spindle and at the same time the spindle has to be free to move when it has been emptied and is to be replaced by another. In order to achieve this result, the upper end of the chute 20 has a portion 20*a* (Fig. 23) which is movable into and out of registry with the end of a spindle 19. This construction is shown more particularly in Figs. 23 and 24. The movable portion of the chute 20*a* is mounted on a pair of pins or rods 168 which pass through bearings 169 and are held by springs 170 so that the chute 20*a* is out of operative position with respect to the end of a spindle. An air cylinder 161 is mounted intermediate the two pins 168 and connected to the chute part 20*a* through its piston rod. When the sleeve 139 reaches the right end of its travel and operates the trip valve 159, air passes through the pipe 156 and the branch 156*a* to force the piston into the position where it carries the section 20*a* into registry with the chute 20 and also into registry with the spindle 19. The air, of course, continues to pass through the line until the gaskets are fed from the particular spindle in registry with the chute. When the sleeve 139 is returned to its initial position, it operates a trip valve 162 which operates the control valve 154 to send air to the opposite end of the cylinder 161.

The springs 170 keep the upper part of the chute 20*a* normally out of registry with the spindles 19. In this way, if the air fails for any reason, and someone attempts to rotate the disc 130, no damage will be done to the parts.

Preferably the upper end of the chute has an L-shaped portion at its top. As shown more particularly in Figs. 21 and 25, the gaskets drop off the spindle into the overhanging portion 171, and the inclined surface 171*a* permits the gasket to roll down into the chute proper. To facilitate this operation, an air jet is provided at 172 and another at 173 (Fig. 24) at substantially right angles to each other. Likewise additional air jets 174, 175 and 176 are provided to be effective on the gaskets as they move down the chute.

As pointed out above, the speed of the motor driving the pusher 137 for the gaskets is controlled by the electric eyes 22 and 24 to maintain the level of the gaskets in the chute intermediate the level of the two electric eyes.

*Operation*

In the operation of the machine, a motor 25, through a reduction gear 27, shaft 26, gear 28, and sun gear 29, drives a table 30 about a central mounting, as shown more particularly in Fig. 1. The gasket-inserting mechanisms 10, including the cap heads or holders 7, are mounted on the table and rotate together thereon. The gasket-inserting mechanisms are mounted directly on the table, and the cap heads 7 are mounted on sleeves 32 which in turn are vertically slidable on shafts 31 secured to the table. The cap heads have side extensions 55, the ends of which substantially abut to provide a continuous runway or track when the heads are in horizontal alignment. The sleeves 32 and the head 7 are moved up and down by means of a cam 34, shown in Fig. 2. Where it is desired to crimp the lower edge of the closure inwardly, as shown in Fig. 5, a crimping member or anvil 35 is mounted on sleeves 36, likewise slidable on the vertical rods 31, for engaging the closure, as shown in Figs. 3 and 5, to crimp the lower edge of it inwardly into locking engagement with the gasket.

The several operations are shown generally in Fig. 2, together with the stations at which they occur. The feeding of caps to the heads 7 occurs at station A. The feeding of gaskets to the gasket-inserting mechanisms 10 occurs at station B, the mechanism being driven from the sun gear 29. The inserting of the gaskets into the closures occurs during the continued rotation of the table. The caps are removed at station C by the removing device 115 and are dropped into an inverter 126 which turns the caps over in their passage to a conveyor 114.

The feeding of the closures is illustrated more particularly in Figs. 18 and 19. Closures are fed to a suitable chute 56 inclined to the horizontal so that the closures slide, one behind another, down the chute. The cap heads 7, in horizontal alignment, pass under the lower end of the chute, as shown in Fig. 19. The cap at the bottom of the chute drops into the seat in the cap head, as shown in Fig. 19, resting on the upper side of the constricted portion 14. The forward side of the cap is resiliently retained against forward movement by the spring fingers 58 held in their retracted position by a spring 60, as shown in Fig. 18. Continued movement of the cap head, when the closure is in the position shown in Fig. 19, causes the forward part of the closure to force open the pivoted fingers 58 so that the cap is released. The forward side of the cap is held down by a spring 62 and the cap is securely pressed into its fully seated position by the wheel or roller 64, as shown in Fig. 6. Both the wheel 64 and the spring 62 are adjustable in position to obtain the best results.

The feeding of gaskets to the gasket-inserting mechanism is illustrated in Figs. 15 and 16, the automatic gasket feed for delivering the gaskets to this feeding mechanism being shown in Figs. 20 to 27, which will be described later. The gaskets are dropped down a chute 20, one behind another in on-edge relationship. At the bottom of the vertical chute, the lower gasket engages stops 78 on opposite sides which hold the gasket in position until engaged by the pin 76 of a pinwheel 15, as shown in Fig. 15. The lower gasket and successive gaskets are then pulled through the stops 78 down through the arcuate portion of the chute where the gaskets again pass through stops 77 in the form of pins and are then dropped into the recesses 16 of a rotating disc 43. The recesses in the disc are timed or synchronized with the pinwheel 15 so that an aperture will pass each time a gasket is delivered. As the disc 43 moves around, the apertures 16 therein register with the aperture 16′ (Fig. 17) in the plate 18 when a gasket-receiving element 9 has also registered with the aperture 16'. The gasket, of course, falls through onto the holder or receiver 9.

The pinwheel 15 may be driven in timed relation with the rotating disc 43 by means of gear 54 on the pinwheel shaft, gear 52 on shaft 51, bevel gear 50 likewise on shaft 51, bevel gear 49 on shaft 48, and gear 47 meshing with gear 43 on the disc shaft 46. In view of the fact that shaft 46 is driven by the rotating table, the rotating table, the disc 43, and the pinwheel 15 are all in timed relation.

After the gaskets have been fed to the member 9, as just described, and after the closure 6 has been fed to a head 7, it becomes necessary to assemble the cap and the gasket. These operations are illustrated more particularly in Figs. 6 to 12. Fig. 6 illustrates the position of the head and the gasket-inserting mechanism just as the cap is seated in the head. Fig. 7 shows the position of the head and gasket-inserting mechanism at the station where the gasket 8 has been dropped over the projection 9. At this point the cam rider 106 has engaged cam 108 and raised the member 9 in position to receive a gasket and guide it down to its seat. In Fig. 8 the gasket is shown fully seated. At this point, as well as in the preceding figure, the outside sleeve has been moved up to telescope about the gasket so that the gasket when seated will be supported on three sides. At this point also a vacuum has been applied through the conduit 111 to draw the gasket down on its seat and hold it firmly in position. Thereafter the head 7 begins to move downwardly toward the gasket-inserting mechanism, as shown in Fig. 9, and likewise the cam roller 106 engages the declined portion of the cam 108 to lower the sleeve 90 and also the gasket guide 9. The spring fingers, retaining the gasket as shown in Fig. 9, pass through the constricted portion 14 directly below the closure in the cap head which constricts the gasket and also the spring fingers until the gasket aligns itself with the skirt of the cap and is forced outwardly by the spring fingers. The vacuum continues to hold the gasket in position and also holds the cap in position on the head. The head is then raised, as shown in Fig. 11, until it reaches its upper position, as shown in dotted lines in Fig. 11.

The operations just described will insert a gasket into a closure having a bead or an inturned edge which supports the gasket. In some cases it is desirable to turn in the lower edge of the closure to lock the gasket in position and to cover the raw edge of the metal at the bottom of the cap to prevent rusting. This may be done by adding an anvil or pressure member 35, as illustrated in Fig. 3, likewise mounted on the rods 31 and moved upwardly and downwardly by a cam 37. When the gasket has been inserted in the closure, as shown in Fig. 10, the anvil comes down on the closure as shown in Fig. 3, and a pressure member 39, which may be resiliently mounted, engages the cam roller on the top of the anvil to give a bumping action which forces the bottom of the skirt of the cap against the annular groove 5 (Fig. 5) on the gasket seat to turn in the edge of the cap and lock the gasket in position.

In either event, the closure cap with the gasket assembled, with or without the interlocking action, continues to move with the rotating table until it reaches the cap-removing device 115 at the cap-removing station C (Fig. 2) whereupon the vacuum cup 121 (Figs. 13 and 14) on the end of one of the arms 118 registers with the head directly above the closure and draws the closure off its seat and transfers it to a cap inverter 126 (Fig. 2) where the closure is dropped down on one side of the inverter as shown in Fig. 2A, and is inverted when it contacts the other side in passing out through the opening in the bottom. Thus the closures are delivered to the conveyor 114 bottomside up to facilitate inspection.

The invention also contemplates the automatic feeding of gaskets to the chute 20 at a rate corresponding to the rate of use by the inserting machine. The mechanism for this purpose is illustrated more particularly in Figs. 20 to 27. Referring to Fig. 20, a plurality of spindles are mounted on the rotatable disc 130 which is held in a series of predetermined positions by the spring press pin 131 so that the lower spindle is in registry with the upper end of the chute 20. These spindles are filled with gaskets, side by side, and a sleeve 137 at the fixed end of each spindle is adapted to force the gaskets off the spindle so that they drop into the chute 20 one at a time.

In order to move the sleeve 137 at a predetermined speed, a motor 144, through the intermediation of a reduction gear 144$a$, drives a threaded shaft 142 in engagement with a cross member 140 slidably mounted by a sleeve 139 on shaft 138. The cross member 140 engages back of the sleeve 137 and slides it along a spindle 134.

When the sleeve 139 carrying the cross member reaches the end of its movement, it engages a valve trip which sends air to one end of the control valve 154. Thereupon the control valve directs air from the pressure line 155 through pipe 152 and branch pipe 152$a$ to cause the air cylinder 150 to move the pin 151 outwardly into engagement with the arm of the counterweight 145 which raises the cross arm 140 and causes the arm 146 to drop onto the conveyor 147. The conveyor 147 is driven by a motor 165 and the lugs 149 thereon return the sleeve 139 and the cross arm to the opposite end of the shaft 138 whereupon it operates a second trip valve which delivers air to the opposite end of the control valve 154 whereupon air is delivered to the pipe 156 and branch pipe 156$a$ to return the pin 151 to its original position and also to the pipe 156$b$ to deliver air to the cylinder 161 and to return the upper end of the chute 20 into registry with a spindle 19. The upper end of the chute is automatically moved away from the spindle when the cross arm 140 reaches the end of its stroke so that the disc 130 may be rotated to replace the spindle from which the gaskets have been removed with a spindle filled with gaskets.

In order to deliver the gaskets to the chute 20 at the speed they are used by the gasket-inserting machine, a pair of electric eyes 22 and 24 (Fig. 25) is provided for controlling the motor 144. The motor has two speeds, one slightly greater than that required to maintain a supply in the chute 22 and the other slightly less than that required to maintain a supply in the chute 20. When the gaskets are below the electric eye 24, the motor is switched to its higher speed until the supply builds up to the level of the electric eye 22 whereupon it is switched to the lower speed; hence the supply of gaskets is kept intermediate the level of the two electric eyes. Suitable air jets are utilized for guiding the gaskets into the chute and for assisting in keeping them moving along the chute. The upper end of the chute, in addition to being movable into and out of alignment with the chute, has an offset portion, as shown in Fig. 25, so that the gasket may roll down the incline 171 into the chute. The incline 171 facilitates removal of the gaskets from the end of the spindle and their entry into the chute proper.

It will be seen that the present invention provides an improved mechanism and method for inserting gaskets in closure caps. The speed of operation is greatly increased and the mutilation of gaskets is eliminated or minimized. The closures are fed automatically to the machine; a feeding device feeds the gaskets automatically to the machine also, and an automatic feeding device separates and feeds gaskets to the feeding device proper and maintains a supply of the gaskets at all times. In the inserting operation the gasket is firmly held in position so that any tendency for it to twist or turn and any irregularities in it are compensated for. The device lends itself to various sizes of closures and caps by changing the inserting mechanism and the sealing heads and the size of spindles for feeding the gaskets. Generally a sufficient volume is manufactured so that a machine may be used at all times on a single size of cap. The parts of the machine are rugged in construction and are fully capable of withstanding the rough use to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

While the invention is described with reference to a particular type of closure, it will be understood that it is applicable to other types of closures and that the description is not intended to limit the invention beyond the true and most comprehensive scope of the claims herein.

Having thus described my invention, I claim:

1. In a device of the class described for inserting ring gaskets into closures, the combination of a plurality of annularly arranged generally radially movable spring fingers each having an inset end portion connected with the remainder thereof by a generally radially extending shoulder portion, the inset portions cooperating with each other and the shoulder portions cooperating with each other to form a pair of annular seats for supporting said ring gasket about its inner periphery and about an adjacent surface thereof, a sleeve extending about said spring fingers and spaced radially from said inset end portions, a guide member disposed within the confines of said annularly arranged fingers having a tapering end portion for directing gaskets toward said seats, and means for reciprocating said sleeve to and from a position in registry with said inset end portions and said guide member between a housed position within said fingers and a guiding position in which it projects beyond end portions of the sleeve and spring fingers for guiding the ring gasket to said seats.

2. In a device of the class described, the combination of a rotatable table comprising a plurality of relatively movable segments each having an opening therethrough surrounded by an annular seat for a skirted closure and annular inclined surface below said skirt seat adapted to receive a closure from one side of the table and a gasket from an opposite side of the table, means for delivering closures to said openings from one side of the table with their skirts facing toward said seats, means above said table for forcing the closures down into said openings and the skirts against said seats into position to receive a said gasket, and means to reciprocate said segments independently of each other for movement toward and away from a gasket inserting station.

3. In a device of the class described for inserting ring gaskets into closures, the combination of a plurality of annularly arranged generally radially movable yieldable fingers each having an inset end portion and a generally radially extending shoulder portion, the inset portions cooperating with each other and the shoulder portions cooperating with each other to form a pair of annular seats for supporting said ring gasket about its inner periphery and about an adjacent surface thereof, means maintaining the yieldable fingers in said annular arrangement, closure holding means having a skirt supporting seat of generally arcuate cross section and an annular inwardly inclined surface below said skirt seat disposed generally toward said pair of annular seats for constricting a gasket supported thereby, means for moving one of said closure holding means and yieldable finger carrying means toward and away from the other for constriction and insertion of the gaskets, and means for forcing a closure toward said arcuate seat to curl a lower edge of the closure skirt toward the gasket and lock it in the closure.

4. In a device of the class described for inserting ring gaskets into closures, the combination of a plurality of annularly arranged generally radially movable yieldable fingers each having an inset end portion and a generally radially extending shoulder portion, the inset portions cooperating with each other and the shoulder portions cooperating with each other to form a pair of annular seats for supporting said ring gasket about its inner periphery and about an adjacent surface thereof, means maintaining the yieldable fingers in said annular arrangement, closure holding means having an opening therethrough and a skirt supporting seat and an annular inwardly inclined surface below said skirt seat disposed generally toward said pair of annular seats for constricting a gasket supported thereby, said skirt supporting seat and inclined surface being located intermediate opposite ends of said opening, and means for moving one of said closure holding means and yieldable finger carrying means toward and away from the other for constriction and insertion of the gaskets.

5. A device as claimed in claim 4, in which a gasket guiding member having a generally tapering exterior surface is disposed within the confines of said annularly arranged fingers, and means is provided for reciprocating the guiding member between a retracted position within said fingers and a guiding position in which it projects beyond end portions of the spring fingers.

6. A device as claimed in claim 5, in which said guiding member has a portion spaced from the end thereof of diameter substantially equal to the inside diameter of said annularly arranged fingers at their inset portions to close the space within said inset portions when the guiding member is projected.

7. In a device of the class described for inserting ring gaskets into closures, the combination of means carrying a plurality of annularly arranged generally radially movable fingers having inset end portions forming an annular seat to maintain a gasket in ring shape and having outwardly extending shoulder portions forming a second annular seat to support a gasket at an end face thereof substantially throughout the length of the gasket, a sleeve member extending around said fingers with an inner surface spaced from said inset end portions, means for moving said sleeve member along the fingers to position an end portion of the sleeve member above said second annular seat and form with the fingers an open channel for receiving and guiding a gasket to seating relationship on said annular seats, apertured closure holding means aligned with said fingers and sleeve member having an inwardly projecting skirt-supporting seat and an annular inwardly inclined surface adjacent and below said skirt-supporting seat disposed generally toward said annular seats of the fingers for constricting a gasket supported throughout its length on each of said annular seats, and means to move one of said closure holding means and finger carrying means toward and away from the other for constriction of gaskets and insertion into closures.

8. A device as claimed in claim 7, in which there is provided a conduit having an opening in communication with the interior of said annularly arranged spring fingers for withdrawing air therefrom to facilitate seating a gasket against said second annular seat.

9. In a device of the class described for inserting ring gaskets into closures, the combination of means carrying a plurality of annularly arranged generally radially movable fingers having inset end portions forming an annular seat to maintain a gasket in ring shape and having outwardly extending shoulder portions forming a second annular seat to support a gasket at an end face thereof substantially throughout the length of the gasket, a sleeve member extending around said fingers with an inner surface spaced from said inset end portions, a conduit communicating with a space at the interior of said annularly arranged fingers to conduct air therefrom, an inner member within the confines of said annularly arranged fingers having a portion of diameter substantially equal to an opening formed by the fingers at their inset portions, and means for moving said sleeve member and inner member along the fingers to position an end portion of the sleeve member adjacent said second annular seat and said substantially equal diameter portion of the inner member into said opening to thereby minimize drawing of air through said opening and between said fingers except at said second annular seat so as to facilitate seating of a gasket against said second annular seat.

10. In a device of the class described for inserting ring gaskets into closures, the combination of a plurality of annularly arranged generally radially movable spring fingers each having an inset end portion connected with the remainder thereof by a generally radially extending shoulder portion, the inset portions cooperating with each other and the shoulder portions cooperating with each other to form a pair of annular seats for supporting said ring gasket about its inner periphery and about an adjacent surface thereof, means maintaining the spring fingers in said annular arrangement, a guide member disposed within the confines of said annularly arranged fingers, said guide member being reciprocable between a housed position within said fingers and a guiding position in which it projects beyond end portions of the spring fingers for guiding the ring gasket to said seats, and means for rotating said guide member to facilitate guiding ring gaskets to said seats.

11. A device as claimed in claim 10, in which said spring fingers are disposed about a generally upright axis and means is provided for moving them through a closed path, a stationary flat gasket supporting plate is disposed above said path and is provided with an aperture therethrough in registry with a portion of said path, and a rotatable flat plate is disposed above and parallel to said stationary plate and has an aperture therethrough registrable with the aperture in the stationary plate to deliver gaskets therethrough onto said guide member.

12. In a device of the class described for feeding ring gaskets and inserting them into closure members, the combination of a member with substantially cylindrical outer surface adapted to form a plurality of ring gaskets into accurately annular shape by engaging and supporting them around their inner peripheries, said member having a diameter substantially equal to the inner diameter of said ring gaskets, means for forcing said shaped gaskets along said member to push them off one at a time, means for conducting the gaskets to inserting means including a chute having opposite walls spaced apart a distance slightly greater than the outside diameter of said ring gaskets to maintain them in substantially ring shape by minimizing spreading apart of oppositely disposed gasket portions, inserting means having an annular seat of diameter substantially equal to the outer surface diameter of said cylindrical member for receiving a said gasket and supporting it substantially entirely about its inner periphery to thereby maintain it in accurately annular shape and having an additional annular seat extending laterally from the first annular seat to support the gasket at an end face thereof substantially throughout its length, means for directing a gasket toward said annular seats, apertured means aligned with said inserting means having an annular inwardly tapering surface for radially constricting the gasket on said inserting means substantially uniformly throughout the gasket length while supported on each of said annular seats to facilitate entry into a closure, and means for moving the inserting means and its additional annular seat and the constricting means and its inwardly tapering surface with respect to each other to slide a gasket along said tapering surface and simultaneously constrict it for entry into a closure member.

13. In a device of the class described for feeding ring gaskets and inserting them into closure members, the combination of a member with substantially cylindrical outer surface adapted to form a plurality of ring gaskets into accurately annular shape by engaging and supporting them around their inner peripheries, said member having a diameter substantially equal to the inner diameter of said ring gaskets, means for forcing said shaped gaskets along said member to push them off one at a time, means for conducting the gaskets to inserting means including a chute having opposite walls spaced apart a distance slightly greater than the diameter of said member to maintain gaskets in substantially ring shape by minimizing spreading apart of oppositely disposed gasket portions, inserting means having an annular seat of diameter substantially equal to the outer surface diameter of said cylindrical member for receiving a said gasket and supporting it substantially entirely about its inner periphery to thereby maintain it in accurately annular shape and having an additional annular seat extending laterally from the first annular seat to support the gasket at an end face thereof substantially throughout its length, means for directing a gasket toward said annular seats, apertured means aligned with said inserting means having an annular inwardly tapering surface for radially constricting the gasket on said fingers substantially uniformly throughout the gasket length while supported on each of said annular seats to facilitate entry into a closure, and means for moving the inserting means and its additional annular seat and the constricting means and its inwardly tapering surface with respect to each other to slide a gasket along said tapering surface and simultaneously constrict it for entry into a closure member.

14. The method of feeding ring gaskets and maintaining them in ring shape which comprises, fitting a plurality of flexible ring gaskets over a cylindrical member having a diameter substantially equal to that of the inside diameters of said gaskets to thereby maintain them in ring shape and placing the gaskets in face to face contact with each other substantially throughout their lengths to thereby maintain their end faces in substantially single planes, pressing said gaskets as a group along said member toward one end thereof while so supported and in said face to face contact to force them off said end, disposing the gaskets in a stack with lower gaskets supporting upper gaskets on their outer circumferences and confining said stacked gaskets at opposite outer circumferential wall portions to maintain them in substantially ring shape and simultaneously confining them at opposite end faces to maintain said faces substantially planar, feeding the gaskets from one end of the stack, fitting the gaskets over inserting means having cylindrical gasket seats of diameter substantially equal to the inside diameter of the gaskets to thereby maintain them in ring shape, inserting the gaskets into cylindrical skirts of closure caps by pushing against the gasket end faces while so supported on said inserting means, and radially constricting the gaskets substantially throughout their lengths simultaneously with said pushing so as to facilitate entry into said cylindrical skirt closure caps.

15. The method as claimed in claim 14, together with applying suction to the gaskets to facilitate fitting them onto the inserting means.

16. The method as claimed in claim 14, together with rotating the gaskets to facilitate fitting them onto the inserting means.

17. In a device of the class described for inserting ring gaskets into closures, the combination of a plurality of spring fingers each having an inset end portion connected with the remainder thereof by a generally radially extending shoulder portion, the inset portions cooperating with each other and the shoulder portions cooperating with each other to form a pair of annular seats for supporting a ring gasket about its inner periphery and about an adjacent surface thereof, means maintaining the spring fingers in said annular arrangement, means for guiding a gasket to said seats, a sleeve concentric with said annular seats, disposed exteriorly of said spring fingers and spaced radially from said inset end portions, and means for moving the sleeve between a position in which its end is adjacent said shoulder portions of the fingers and a position in which its end is spaced below the shoulder to facilitate seating of said ring gasket thereagainst.

18. A device as claimed in claim 12 in which said forcing means maintains a constant pressure against the gaskets and in which means is provided for increasing the speed of said forcing means when the number of gaskets in the chute is less than a predetermined number, and for decreasing the speed of said forcing means when the number of gaskets in the chute is greater than a predetermined number.

19. A device of the class described comprising the combination of a rod member having a substantially cylindrical outer surface adapted to hold ring gaskets and maintain them in accurately annular shape by engaging them substantially throughout their inner peripheries, a chute adjacent the discharge end of said rod member to receive gaskets pushed therefrom, a pusher member movable along said rod member to push gaskets therealong, a threaded shaft generally parallel to said rod member, a multiple speed motor operatively connected to said threaded shaft for rotating it, a guide shaft generally parallel to said rod member, means carried by and projecting from said guide shaft movable into and out of engagement with both said threaded shaft and pusher member to move the pusher member along the rod member during said engagement and threaded shaft rotation and facilitating movement of said means along the guide shaft to an initial position when disengaged from said threaded shaft, a first photo-electric cell unit located at one portion of the chute to effect operation of the motor at one speed, and a second photo-electric cell unit is located at a portion of the chute spaced from said first unit to effect operation of the motor at a different speed.

20. A device of the class described comprising the combination of a rotatable member, a plurality of rod members carried by said rotatable member at spaced intervals, each of said rod members having a substantially cylindrical outer surface adapted to hold ring gaskets and maintain them in accurately annular shape by engaging them substantially throughout their inner peripheries, a pusher member movable along each of said rod members to push gaskets therealong, a threaded shaft generally parallel to said rod members, said rod members being movable successively into proximity to said threaded shaft by rotation of said rotatable member, a guide shaft generally parallel to said rod members, and means carried by and projecting from said guide shaft movable into and out of engagement with both said threaded shaft and pusher member to move the pusher member along a rod member during said threaded shaft engagement and threaded shaft rotation and facilitating movement of said means along the guide shaft to an initial position when disengaged from said threaded shaft.

21. A device as claimed in claim 20, in which there is provided a chute adjacent one end of said threaded shaft for receiving gaskets pushed from the rod members, and said chute includes a portion movable out of registry with an adjacent chute portion to facilitate movement of a rod member away from said chute and presentation of a succeeding rod member thereto.

GORDON W. HERROLD.

(References on following page)

References Cited in the file of this patent

UNITED STATES PATENTS

| Number | Name | Date |
|---|---|---|
| Re. 14,708 | Graham | Aug. 19, 1919 |
| Re. 19,460 | Parks | Feb. 12, 1935 |
| 719,689 | Painter | Feb. 3, 1903 |
| 725,701 | Hall | Apr. 21, 1903 |
| 1,005,049 | Lorenzen | Oct. 3, 1911 |
| 1,050,565 | Ryder | Jan. 14, 1913 |
| 1,106,607 | Woellert | Aug. 11, 1914 |
| 1,162,169 | Johnson | Nov. 30, 1915 |
| 1,355,040 | Graham | Oct. 5, 1920 |
| 1,389,752 | Graham | Sept. 6, 1921 |
| 1,739,153 | Laxo | Dec. 10, 1929 |
| 1,776,227 | Wieland | Sept. 16, 1930 |
| 1,841,590 | Gray | Jan. 19, 1932 |
| 1,864,903 | Gora | June 28, 1932 |
| 2,079,813 | Podel | May 11, 1937 |
| 2,098,906 | White | Nov. 9, 1937 |
| 2,158,069 | Grover | May 16, 1939 |
| 2,163,082 | Brandt | June 20, 1939 |
| 2,166,598 | Kronquest | July 18, 1939 |
| 2,180,601 | Mitchell | Nov. 21, 1939 |
| 2,229,639 | Cornell | Jan. 28, 1941 |
| 2,254,291 | Joa | Sept. 2, 1941 |
| 2,255,707 | Kronquest | Sept. 9, 1941 |
| 2,348,464 | Geertsema | Mar. 9, 1944 |
| 2,349,456 | Olson | May 23, 1944 |
| 2,365,902 | Powers | Dec. 26, 1944 |
| 2,381,505 | Lindholm | Aug. 7, 1945 |
| 2,479,955 | Morgan | Aug. 23, 1949 |
| 2,507,072 | Weber | May 9, 1950 |
| 2,557,358 | Martinson | June 19, 1951 |
| 2,574,195 | Sherrick | Nov. 6, 1951 |

FOREIGN PATENTS

| Number | Country | Date |
|---|---|---|
| 412,602 | Great Britain | June 22, 1934 |